US012782767B2

(12) United States Patent
Kil et al.

(10) Patent No.: US 12,782,767 B2

(45) Date of Patent: Nov. 3, 2026

(54) DISPLAY DEVICE

(71) Applicant: InnoTV Labs, LLC, Las Vegas, NV (US)

(72) Inventors: Hyongil Kil, Seoul (KR); Sangmin Baek, Seoul (KR)

(73) Assignee: InnoTV Labs, LLC, Las Vegas, NV (US)

( * ) Notice: Subject to any disclaimer, the term of this patent is extended or adjusted under 35 U.S.C. 154(b) by 188 days.

(21) Appl. No.: 18/913,612

(22) Filed: Oct. 11, 2024

(65) Prior Publication Data

US 2025/0035970 A1 Jan. 30, 2025

Related U.S. Application Data

(63) Continuation of application No. 18/647,711, filed on Apr. 26, 2024, now Pat. No. 12,140,830, which is a (Continued)

(30) Foreign Application Priority Data

Mar. 26, 2018 (KR) ........................ 10-2018-0034470

(51) Int. Cl.
*G02F 1/1333* (2006.01)
*F21V 8/00* (2006.01)

(52) U.S. Cl.
CPC ....... *G02F 1/133308* (2013.01); *G02B 6/005* (2013.01); *G02B 6/0088* (2013.01); *G02F 1/1333* (2013.01); *G02F 1/133314* (2021.01); *G02F 1/133317* (2021.01); *G02F 1/13332* (2021.01); *G02F 1/133322* (2021.01); (Continued)

(58) Field of Classification Search
None
See application file for complete search history.

(56) References Cited

U.S. PATENT DOCUMENTS 9,720,269 B2 8/2017 Jung et al.
10,768,458 B2 9/2020 Kil et al.
(Continued)

FOREIGN PATENT DOCUMENTS

KR 10-2001-0103599 A 11/2001
KR 10-2013-0068967 A 6/2013
(Continued)

*Primary Examiner* — Richard H Kim
(74) *Attorney, Agent, or Firm* — WOMBLE BOND DICKINSON (US) LLP

(57) ABSTRACT

A display device can include a display panel, a frame at a rear of the display panel, a back cover at a rear of the frame, and a front cover coupled with the back cover, which includes a horizontal part covering an edge of a front surface of the display panel, and a vertical part rearwardly extending from the horizontal part and covering a side of the display panel. Also, the back cover includes a horizontal portion facing the rear, a vertical portion extending from the horizontal portion aligned with the vertical part, and a coupling portion protruding from an inside of the back cover and extending over an inner surface of the vertical portion with a gap between the inner surface of the vertical portion and the coupling portion, and a protrusion formed at the inner surface of the vertical portion and positioned adjacent to the coupling portion.

24 Claims, 30 Drawing Sheets

Related U.S. Application Data continuation of application No. 18/181,411, filed on Mar. 9, 2023, now Pat. No. 12,038,636, which is a continuation of application No. 17/701,138, filed on Mar. 22, 2022, now Pat. No. 11,846,839, which is a continuation of application No. 16/989,152, filed on Aug. 10, 2020, now Pat. No. 11,287,680, which is a continuation of application No. 16/204,086, filed on Nov. 29, 2018, now Pat. No. 10,768,458.

(52) U.S. Cl.
CPC ...... *G02F 2201/46* (2013.01); *G02F 2201/50* (2013.01); *G02F 2201/503* (2013.01)

(56) References Cited

U.S. PATENT DOCUMENTS

| | | | |
|---|---|---|---|
| 11,287,680 B2 | 3/2022 | Kil et al. | |
| 2002/0125815 A1 | 9/2002 | Wakita | |
| 2013/0155717 A1 | 6/2013 | Jeong et al. | |
| 2013/0321717 A1 | 12/2013 | Kuromizu | |
| 2013/0335669 A1 | 12/2013 | Chen et al. | |
| 2015/0362787 A1 | 12/2015 | Yuan et al. | |
| 2016/0259201 A1* | 9/2016 | Que | G02F 1/133308 |
| 2017/0299913 A1 | 10/2017 | Choi | |
| 2019/0113808 A1 | 4/2019 | Isono et al. | |
| 2022/0171238 A1 | 6/2022 | Oh et al. | |

FOREIGN PATENT DOCUMENTS

| | | |
|---|---|---|
| KR | 10-2013-0074794 A | 7/2013 |
| KR | 10-2016-0074771 A | 6/2016 |
| WO | WO 2013/047366 A1 | 4/2013 |

* cited by examiner

DISPLAY DEVICE

CROSS-REFERENCE TO RELATED APPLICATIONS

This application is a Continuation of U.S. patent application Ser. No. 18/647,711 filed on Apr. 26, 2024 (now U.S. Pat. No. 12,140,830 issued on Nov. 12, 2024), which is a Continuation of U.S. patent application Ser. No. 18/181,411 filed on Mar. 9, 2023 (now U.S. Pat. No. 12,038,636 issued on Jul. 16, 2024), which is a Continuation of U.S. Patent Application No. 17/701,138 filed on Mar. 22, 2022 (now U.S. Pat. No. 11,846,839 issued on Dec. 19, 2023), which is a Continuation of U.S. patent application Ser. No. 16/989,152 filed on Aug. 10, 2020 (now U.S. Pat. No. 11,287,680 issued on Mar. 29, 2022), which is a Continuation of U.S. patent application Ser. No. 16/204,086 filed on Nov. 29, 2018 (now U.S. Pat. No. 10,768,458 issued on Sep. 8, 2020), which claims the priority benefit under 35 U.S.C. § 119 (a) to Korean Patent Application No. 10-2018-0034470 filed in the Republic of Korea on Mar. 26, 2018, all of which are hereby expressly incorporated by reference into the present application.

BACKGROUND OF THE INVENTION

Field of the Invention

The present disclosure relates to a display device.

Discussion of the Related Art

With the development of the information society, various demands for display devices are increasing. Various display devices, such as liquid crystal displays (LCDs), plasma display panels (PDPs), electroluminescent displays (ELDs), and vacuum fluorescent displays (VFDs), have been recently studied and used in response to the various demands for the display devices.

A display device using an organic light emitting diode (OLED) is advantageous in that it has better luminance characteristic and viewing angle characteristic than a liquid crystal display, and has a ultra-thin profile because it does not require a backlight unit unlike the liquid crystal display.

Recently, studies have been actively conducted to improve an assembling structure of a display device while securing rigidity of the display device.

SUMMARY OF THE INVENTION

An object of the present disclosure is to address the above-described and other problems. Another object of the present disclosure is to provide a display device capable of improving constraints of a structural design.

Another object of the present disclosure is to provide a display device in which a display panel is coupled to a front cover.

Another object of the present disclosure is to provide a display device in which an optical sheet is coupled to a front cover.

Another object of the present disclosure is to provide a display device in which a frame is coupled to a front cover.

Another object of the present disclosure is to provide a display device in which a back cover is coupled to a front cover.

Another object of the present disclosure is to provide a display device in which a number of components is reduced.

Another object of the present disclosure is to provide a display device with a reduced thickness.

Another object of the present disclosure is to provide a display device having a structure capable of increasing efficiency of an assembly process.

In one aspect of the present disclosure, there is provided a display device comprising: a display panel; a front cover including a front part covering an edge of a front surface of the display panel, a side part extended from the front part and covering a side surface of the display panel, and a guide protruding from the side part and contacting the side surface of the display panel; a frame including a rear part positioned in a rear of the display panel and a supporting part extended from the rear part and supporting a rear surface of the display panel; and a back cover positioned in the rear of the frame and coupled to the side part of the front cover, wherein the side part of the front cover is coupled to the frame.

According to another aspect of the present disclosure, the display device may further comprise a pad positioned between the front part and the front surface of the display panel and fixed to the front part.

According to another aspect of the present disclosure, the front cover may include a groove formed on the front part and facing the display panel, and the pad may be accommodated in the groove.

According to another aspect of the present disclosure, the front part may include a first part including the groove and a second part bent rearward from the first part, and the side part may be extended from the second part.

According to another aspect of the present disclosure, the frame may include a first hole facing the front part. The front cover may include a hook portion positioned between the side surface of the display panel and the side part, protruding rearward from the front part, and passing through the first hole.

According to another aspect of the present disclosure, the display device may further comprise an optical sheet including a second hole facing the first hole, the optical sheet being positioned between the display panel and the frame. The hook portion may pass through the second hole.

According to another aspect of the present disclosure, the display device may further comprise a reflective sheet including a third hole facing the first hole, the reflective sheet being positioned between the display panel and the frame. The hook portion may pass through the third hole.

According to another aspect of the present disclosure, the front cover may include a fourth hole formed in the side part. The frame may include a second side part extended rearward from the supporting part, facing the side part of the front cover that is a first side part, and adjacent to the side part and a protrusion protruding from the second side part toward the first side part of the front cover and inserted into the fourth hole.

According to another aspect of the present disclosure, the frame may include a fifth hole formed in the supporting part. The front cover may include a rib protruding rearward from the first front part and inserted into the fifth hole.

According to another aspect of the present disclosure, the front cover may include a latching jaw protruding from the side part to an outside. The back cover may include a third part facing the frame, a fourth part extended forward from the third part, and a hook protruding from the fourth part to an inside of the fourth part and catching on the latching jaw.

According to another aspect of the present disclosure, the front cover may include a second latching jaw protruding from the side part to an inside. The back cover may include a third part facing the frame, a fourth part extended forward from the third part, and a second hook protruding from the fourth part to an inside of the fourth part and catching on the second latching jaw.

According to another aspect of the present disclosure, the frame may include an opening formed in the side vertical part. The second latching jaw may be positioned in the opening.

According to another aspect of the present disclosure, the second hook may include a fifth part and a sixth part adjacent to the fifth part. The second latching jaw may be caught between the fifth part and the sixth part.

According to another aspect of the present disclosure, the fourth part may include a first subpart extended forward from the third part, the first subpart including the second hook, and a second subpart extended forward from the first subpart and covering the side part.

According to another aspect of the present disclosure, the display device may further comprise a backlight unit positioned between the display panel and the frame and providing light to the display panel.

Effects of a display device according to the present disclosure are described as follows.

According to at least one aspect of the present disclosure, a display panel can be coupled to a front cover.

According to at least one aspect of the present disclosure, an optical sheet can be coupled to a front cover.

According to at least one aspect of the present disclosure, a frame can be coupled to a front cover.

According to at least one aspect of the present disclosure, a back cover can be coupled to a front cover.

According to at least one aspect of the present disclosure, the number of components can be reduced.

According to at least one aspect of the present disclosure, a thickness of a display device can be reduced.

According to at least one aspect of the present disclosure, efficiency of an assembly process of a display device can be increased.

BRIEF DESCRIPTION OF THE DRAWINGS

The accompanying drawings, that may be included to provide a further understanding of the disclosure and are incorporated in and constitute a part of this specification, illustrate embodiments of the disclosure and together with the description serve to explain various principles of the disclosure.

DETAILED DESCRIPTION OF THE EMBODIMENTS

Figure 1:
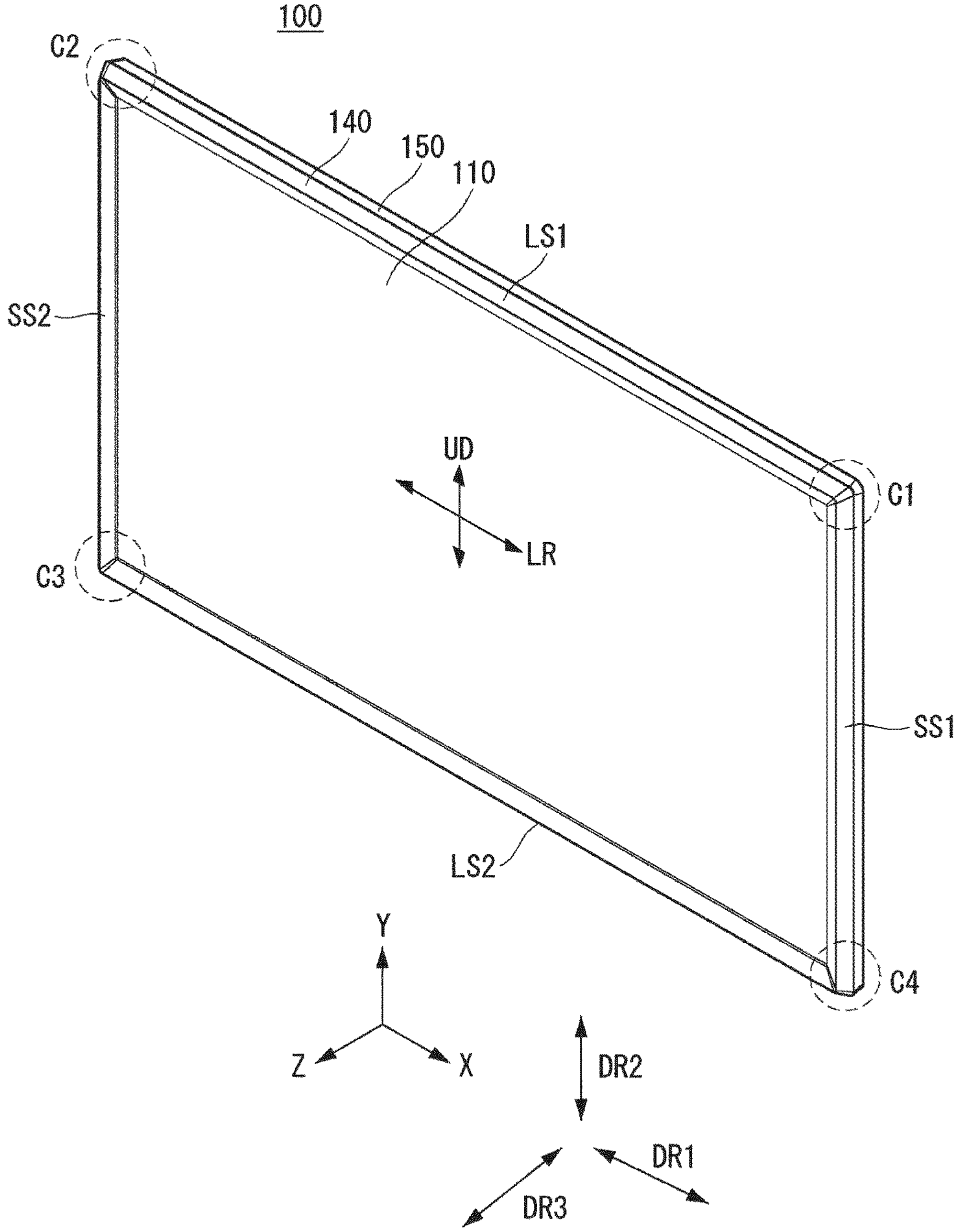
FIGS. 1 to 30 illustrate examples of configuration of a display device according to an embodiment of the disclosure.

Reference will now be made in detail embodiments of the disclosure examples of which are illustrated in the accompanying drawings. Since the present disclosure may be modified in various ways and may have various forms, specific embodiments are illustrated in the drawings and are described in detail in the present specification. However, it should be understood that the present disclosure is not limited to specific disclosed embodiments, but include all modifications, equivalents and substitutes included within the spirit and technical scope of the present disclosure.

The terms 'first', 'second', etc. may be used to describe various components, but the components are not limited by such terms. The terms are used only for the purpose of distinguishing one component from other components. For example, a first component may be designated as a second component without departing from the scope of the present disclosure. In the same manner, the second component may be designated as the first component.

The term "and/or" encompasses both combinations of the plurality of related items disclosed and any item from among the plurality of related items disclosed.

When an arbitrary component is described as "being connected to" or "being linked to" another component, this should be understood to mean that still another component (s) may exist between them, although the arbitrary component may be directly connected to, or linked to, the second component. In contrast, when an arbitrary component is described as "being directly connected to" or "being directly linked to" another component, this should be understood to mean that no component exists between them.

The terms used in the present application are used to describe only specific embodiments or examples, and are not intended to limit the present disclosure. A singular expression can include a plural expression as long as it does not have an apparently different meaning in context.

In the present application, the terms "include" and "have" should be understood to be intended to designate that illustrated features, numbers, steps, operations, components, parts or combinations thereof exist and not to preclude the existence of one or more different features, numbers, steps, operations, components, parts or combinations thereof, or the possibility of the addition thereof.

Unless otherwise specified, all of the terms which are used herein, including the technical or scientific terms, have the same meanings as those that are generally understood by a person having ordinary knowledge in the art to which the present disclosure pertains. The terms defined in a generally used dictionary must be understood to have meanings identical to those used in the context of a related art, and are not to be construed to have ideal or excessively formal meanings unless they are obviously specified in the present application.

The following exemplary embodiments of the present disclosure are provided to those skilled in the art in order to describe the present disclosure more completely. Accordingly, shapes and sizes of elements shown in the drawings may be exaggerated for clarity.

In the following description, wherever possible, the same reference numbers will be used throughout the drawings to refer to the same or like parts, and duplicated description thereof will be omitted.

In the following description, if an embodiment is described with reference to a specific figure, reference numbers not shown in the specific figure may be mentioned, if necessary or desired. However, the reference numbers not shown in the specific figure may be mentioned only when the reference numbers are shown in other figures.

In general, a suffix such as "module" and "unit" may be used to refer to elements or components. Use of such a suffix herein is merely intended to facilitate description of the specification, and the suffix itself is not intended to give any special meaning or function.

It will be noted that a detailed description of known arts will be omitted if it is determined that the detailed description of the known arts can obscure embodiments of the disclosure.

Further, terms such as height, length, and width used in embodiments of the disclosure may be interchangeable for convenience of explanation. The terms do not have their meanings or roles that are distinguished from each other.

Hereinafter, embodiments of the disclosure will be described using a liquid crystal display panel as an example of a display panel. However, embodiments are not limited thereto.

Referring to FIG. 1, a display device 100 may include a first long side LS1, a second long side LS2 opposite the first long side LS1, a first short side SS1 adjacent to the first long side LS1 and the second long side LS2, and a second short side SS2 opposite the first short side SS1.

The first short side SS1 may be referred to as a first side area; the second short side SS2 may be referred to as a second side area opposite the first side area; the first long side LS1 may be referred to as a third side area which is adjacent to the first side area and the second side area and is positioned between the first side area and the second side area; and the second long side LS2 may be referred to as a fourth side area which is adjacent to the first side area and the second side area, is positioned between the first side area and the second side area, and is opposite to the third side area.

Embodiments of the disclosure describe that lengths of the first and second long sides LS1 and LS2 are longer than lengths of the first and second short sides SS1 and SS2 for convenience of explanation. However, the lengths of the first and second long sides LS1 and LS2 may be equal to or almost equal to the lengths of the first and second short sides SS1 and SS2.

A first direction DR1 may be a direction parallel to the long sides LS1 and LS2 of a display panel 110. A second direction DR2 may be a direction parallel to the short sides SS1 and SS2 of the display panel 110. A third direction DR3 may be a direction vertical to the first direction DR1 and/or the second direction DR2.

The first direction DR1 and the second direction DR2 may be commonly referred to as a horizontal direction. The third direction DR3 may be referred to as a vertical direction.

A side, on which a display device displays an image, may be referred to as a forward direction, a front side, or a front surface. When the display device displays an image, a side at which the image cannot be viewed may be referred to as a rearward direction, a rear side, or a rear surface. When the display device is observed at the forward direction, the front side, or the front surface, the first long side LS1 may be referred to as an upper side or an upper surface. The second long side LS2 may be referred to as a lower side or a lower surface. Further, the first short side SS1 may be referred to as a right side or a right surface, and the second short side SS2 may be referred to as a left side or a left surface.

The first long side LS1, the second long side LS2, the first short side SS1, and the second short side SS2 may be referred to as edges of the display device 100. Further, positions where the first long side LS1, the second long side LS2, the first short side SS1, and the second short side SS2 meet each other may be referred to as corners. For example, a position where the first long side LS1 and the first short side SS1 meet each other may be referred to as a first corner C1, a position where the first long side LS1 and the second short side SS2 meet each other may be referred to as a second corner C2, a position where the second short side SS2 and the second long side LS2 meet each other may be referred to as a third corner C3, and a position where the second long side LS2 and the first short side SS1 meet each other may be referred to as a fourth corner C4.

A direction from the first short side SS1 to the second short side SS2 or a direction from the second short side SS2 to the first short side SS1 may be referred to as a left-right direction LR. A direction from the first long side LS1 to the second long side LS2 or a direction from the second long side LS2 to the first long side LS1 may be referred to as an up-down direction UD.

The X-axis may be parallel to the first direction. The Y-axis may be parallel to the second direction. The Z-axis may be parallel to the third direction. The +X-axis may face the right side, and the −X-axis may face the left side. The +Y-axis may face the upper side, and the −Y-axis may face the lower side. The +Z-axis may face the front side, and the −Z-axis may face the rear side.

The display panel 110 may display an image in the forward direction. A front cover 140 may be fastened to a back cover 150. The display panel 110 may be positioned between the front cover 140 and the back cover 150.

Figure 2:
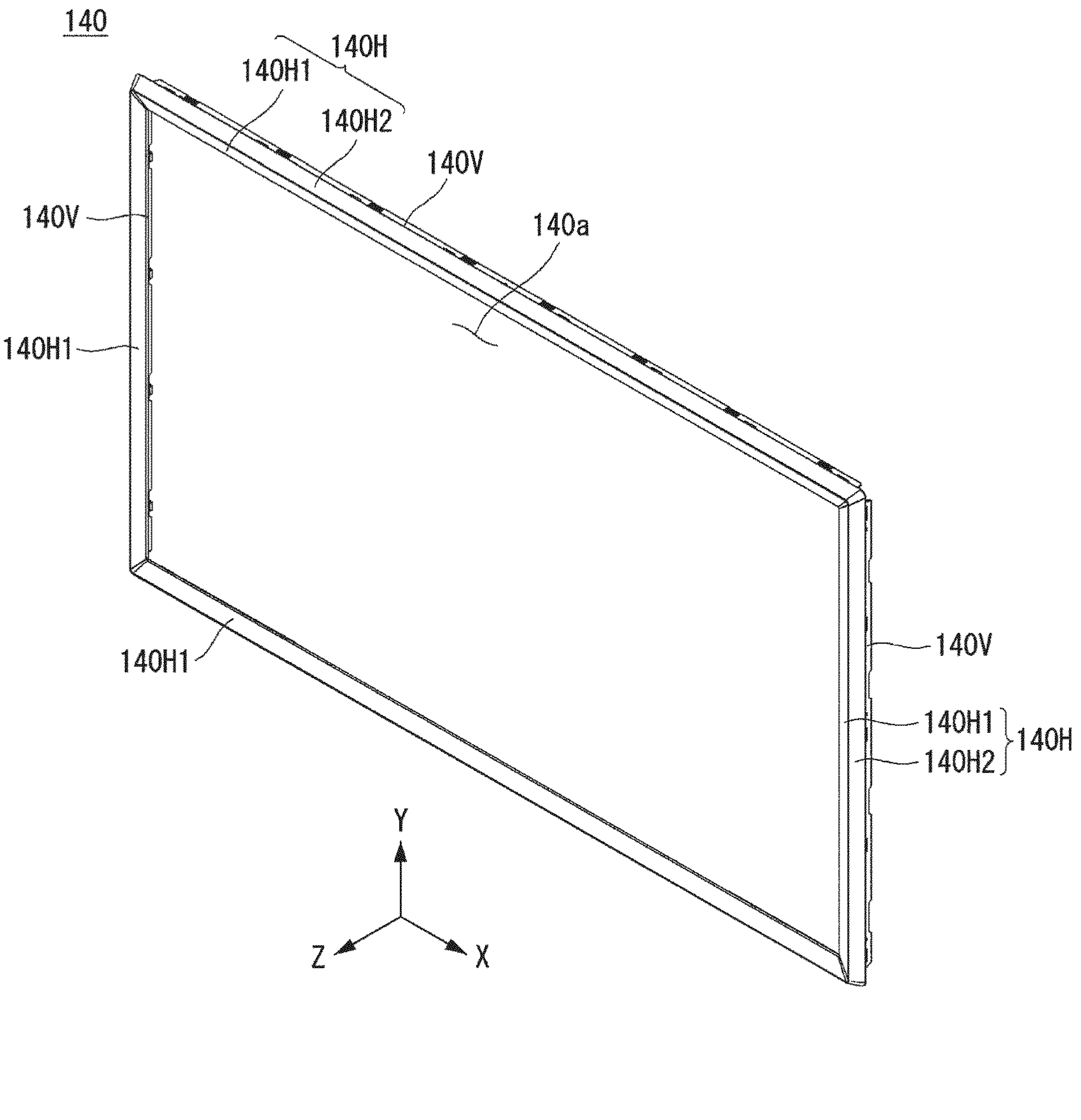

Referring to FIG. 2, the front cover 140 may have a quadrilateral shape. The front cover 140 may be referred to as a front case 140. The front cover 140 may include an opening 140*a*. The opening 140*a* may have a quadrilateral shape. The front cover 140 may include a horizontal part 140H and a vertical part 140V. The horizontal part 140H may include a first horizontal part 140H1 and a second horizontal part 140H2. The first horizontal part 140H1 and the second horizontal part 140H2 may be connected obliquely.

Figure 3:
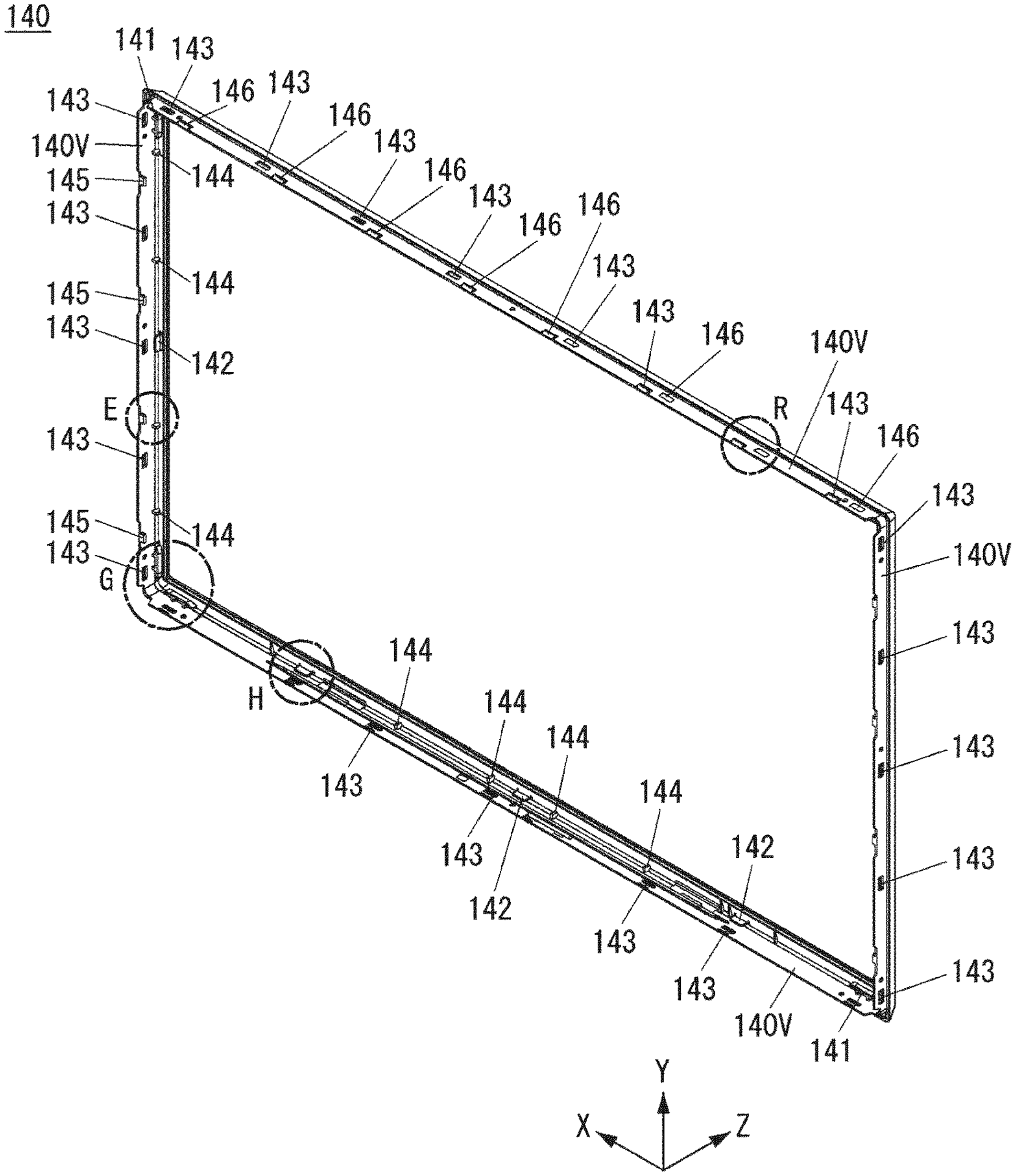
Figure 4:
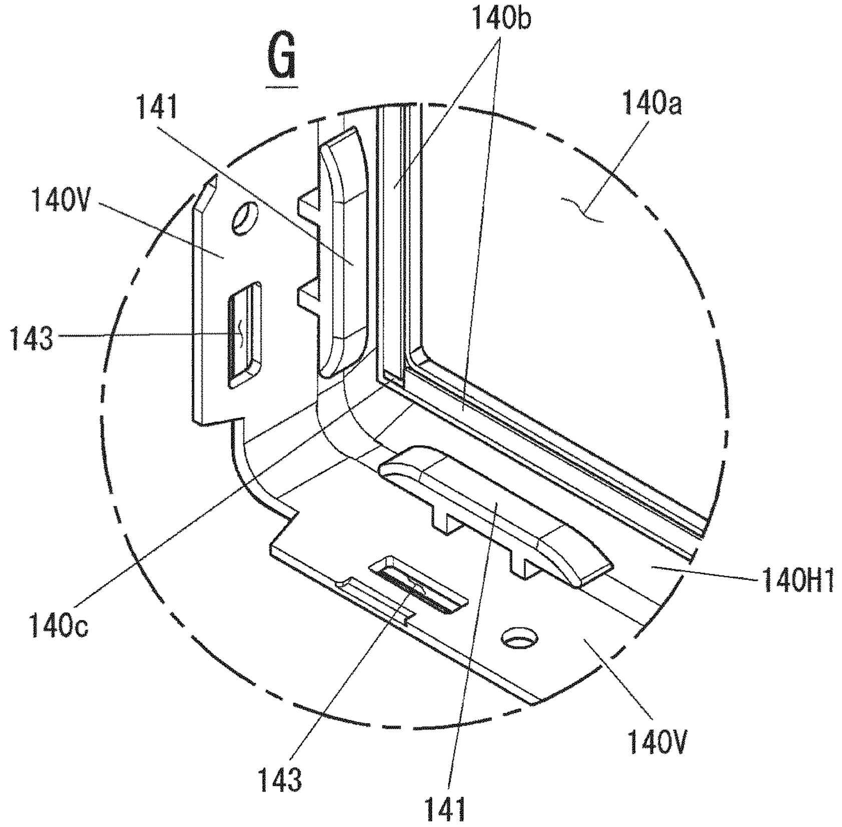

Referring to FIGS. 3 and 4, a pad 140*b* may be positioned on a rear surface of the first horizontal part 140H1. The pad 140*b* may be formed along the perimeter of the front cover 140. The pad 140*b* may be adjacent to or in contact with a front surface of the display panel 110. The first horizontal part 140H1 may include a groove 140*c*, and the pad 140*b* may be positioned in the groove 140*c*. A protrusion 141 may protrude from the vertical part 140V. The protrusion 141 may be referred to as a guide 141 or a panel guide 141. The plurality of protrusions 141 may be formed along the perimeter of the front cover 140. The protrusion 141 may be formed in a corner area of the front cover 140. The protrusion 141 may be adjacent to or in contact with the side of the display panel 110. A hole 143 may be formed in the vertical part 140V. The hole 143 may be referred to as a coupling hole 143, a coupling portion 143, or a fastening portion 143. The plurality of holes 143 may be formed along the perimeter of the front cover 140. The hole 143 may be formed in the corner area of the front cover 140.

Figure 5:
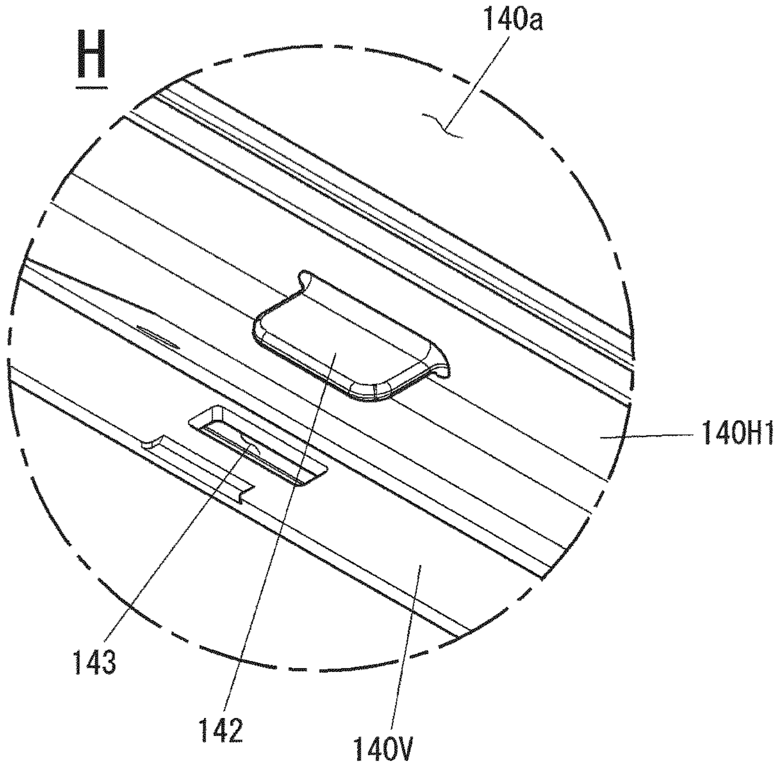

Referring to FIGS. 3 and 5, a protrusion 142 may protrude from the first horizontal part 140H1. The protrusion 142 may be referred to as a hook portion 142, a latching portion 142, a hook 142, or a coupling portion 142. The plurality of protrusions 142 may be formed along the perimeter of the front cover 140.

Figure 6:
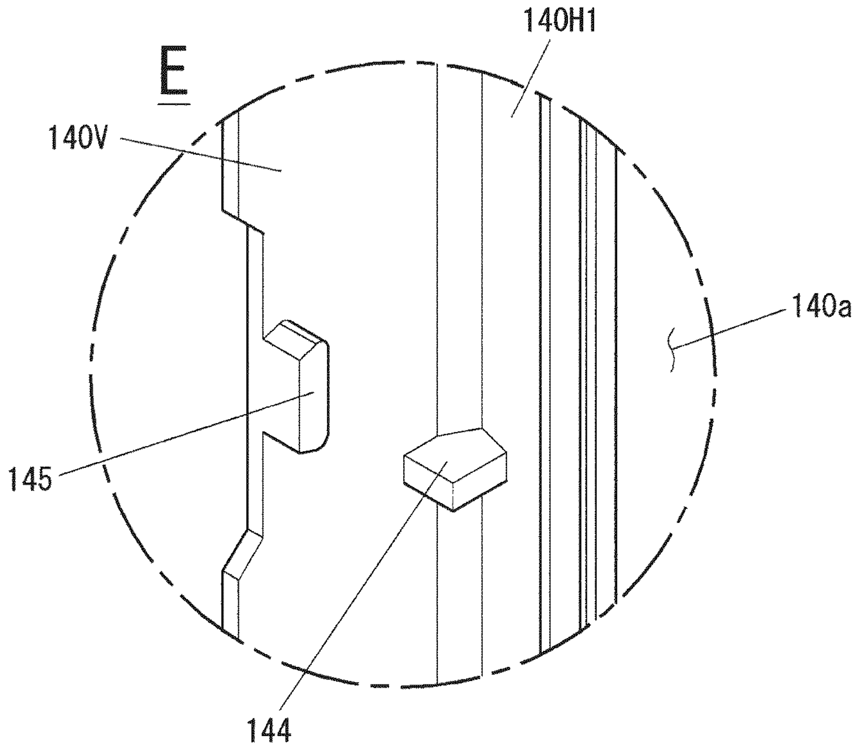

Referring to FIGS. 3 and 6, a protrusion 144 may protrude from the first horizontal part 140H1 or the vertical part 140V. The protrusion 144 may be referred to as a guide 144 or a rib 144. A protrusion 145 may protrude from a corner area formed by the first horizontal part 140H1 and the vertical part 140V. The plurality of protrusions 145 may be formed along the perimeter of the front cover 140. The protrusion 145 may protrude from the vertical part 140V. The protrusion 145 may be referred to as a coupling portion 145, a fastening portion 145, or a coupling protrusion 145. The plurality of protrusions 145 may be formed along the perimeter of the front cover 140.

Figure 7:
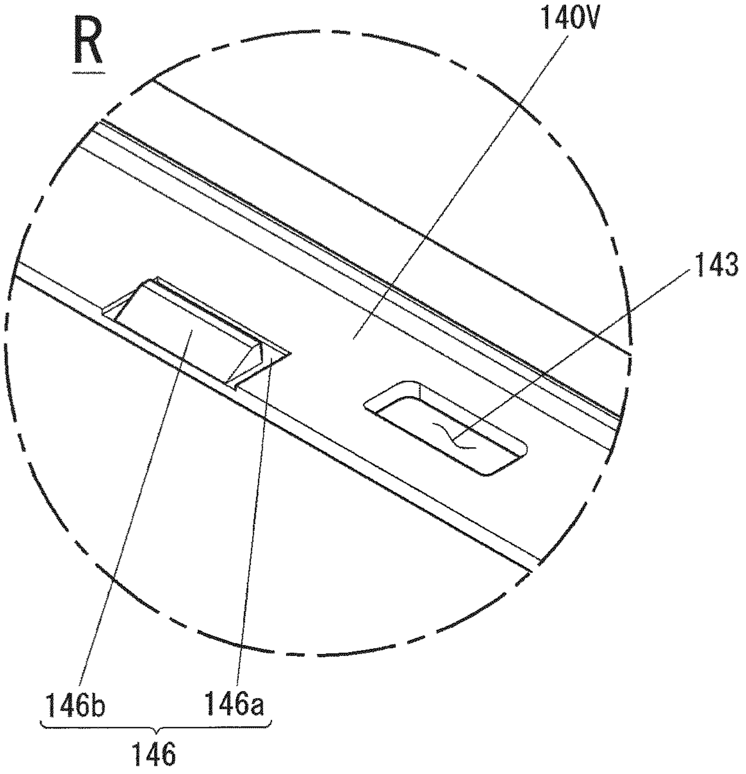

Referring to FIGS. 3 and 7, a groove 146*a* may be formed on an outer surface of the vertical part 140V. The groove 146*a* may be referred to as a stepped portion 146*a*. A protrusion 146*b* may protrude from the groove 146*a*. The groove 146*a* and the protrusion 146*b* may be collectively referred to as a latching portion 146, a protrusion 146, a coupling portion 146, a hook 146, a latching jaw 146, or a fastening portion 146. The plurality of latching portions 146 may be formed along the perimeter of the front cover 140.

Figure 8:
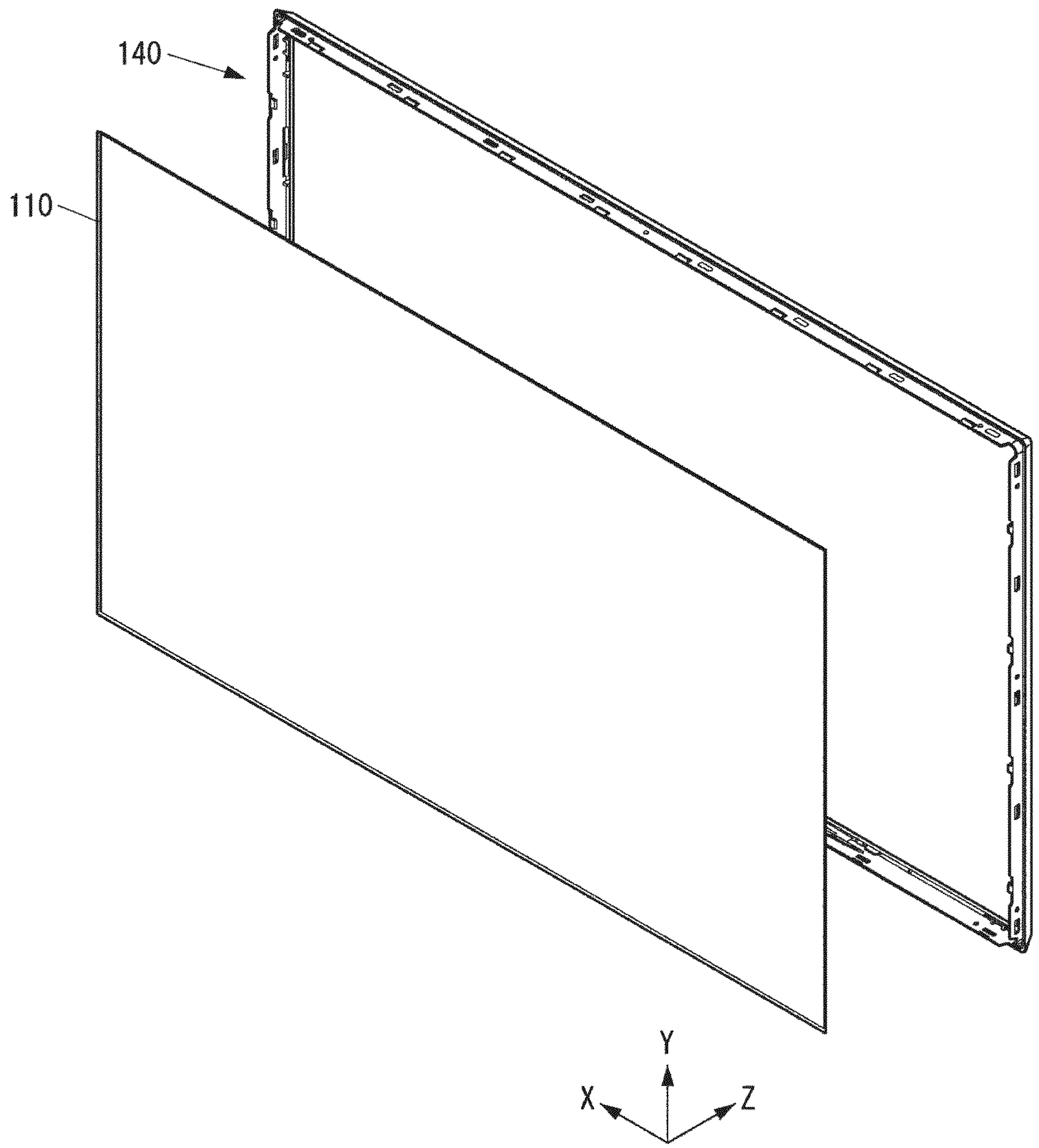

Referring to FIG. 8, the display panel 110 may be coupled to the front cover 140. The display panel 110 may be positioned in the rear of the front cover 140. The display panel 110 may be provided on the front surface of the display device 100 and can display an image. The display panel 110 can display an image by outputting red, green, and blue light from each of a plurality of pixels at proper timing. The display panel 110 may be divided into an active area on which an image is displayed, and a de-active area on which the image is not displayed. The display panel 110 may include a front substrate and a rear substrate that are positioned opposite each other with a liquid crystal layer interposed therebetween.

The front substrate may include the plurality of pixels each including red, green, and blue subpixels. The front substrate may output light corresponding to red, green, or blue color in response to a control signal.

The rear substrate may include switching elements. The rear substrate may switch on and off pixel electrodes. For example, the pixel electrodes may change a molecule arrangement of the liquid crystal layer in response to a control signal received from the outside. The liquid crystal layer may include liquid crystal molecules. The arrangement of the liquid crystal molecules may be changed corresponding to a voltage difference between the pixel electrode and a common electrode. The liquid crystal layer may transfer light provided by a light source 124 (see FIG. 17) to the front substrate, or may shield the light.

Figure 9:
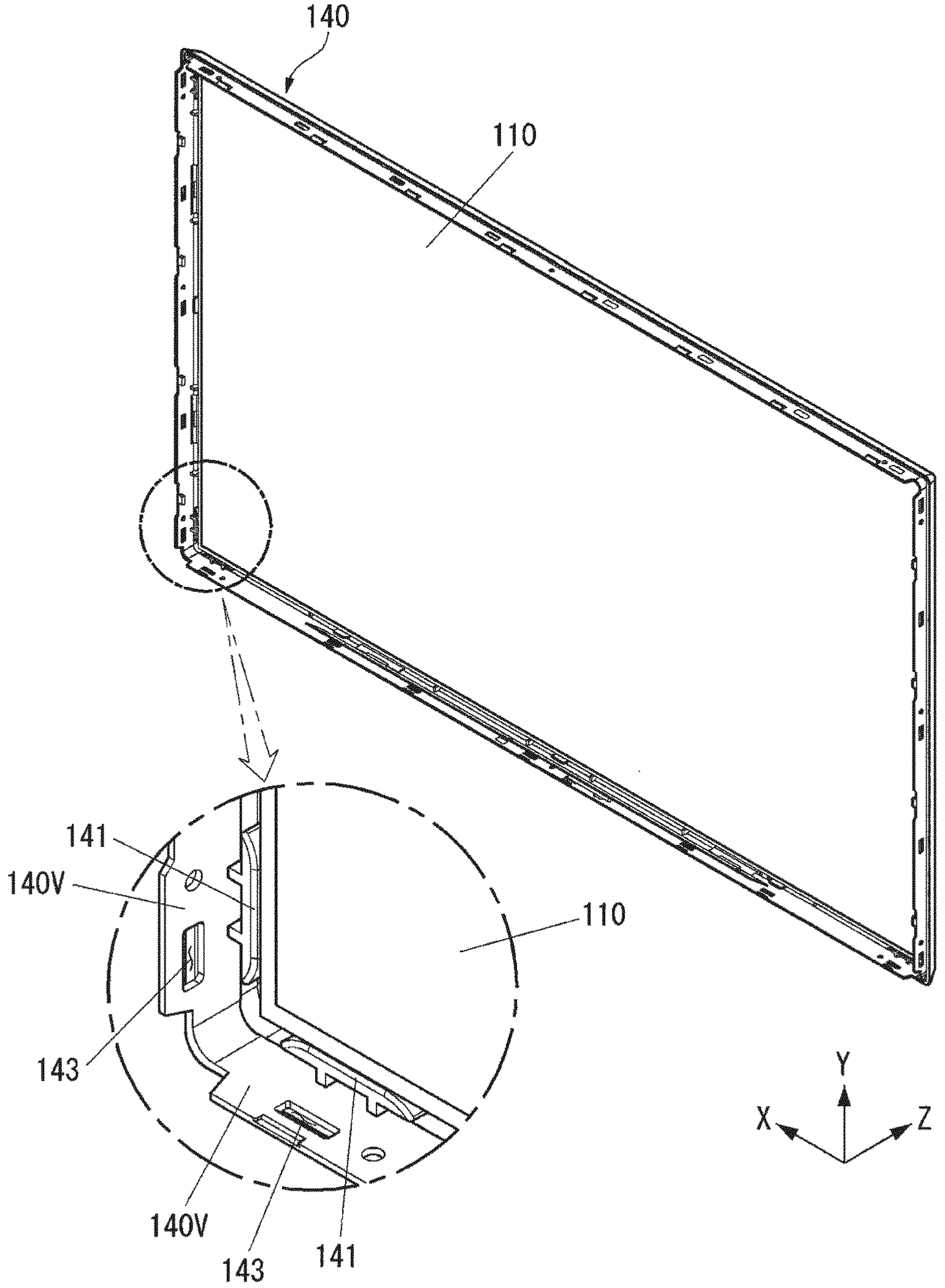

Referring to FIG. 9, a front surface of the display panel 110 may face the first horizontal part 140H1. The guide 141 may be adjacent to or in contact with the side surface of the display panel 110. The guide 141 may be adjacent to or in contact with a corner area of the display panel 110. The guide 141 may align or guide a location of the display panel 110.

Figure 10:
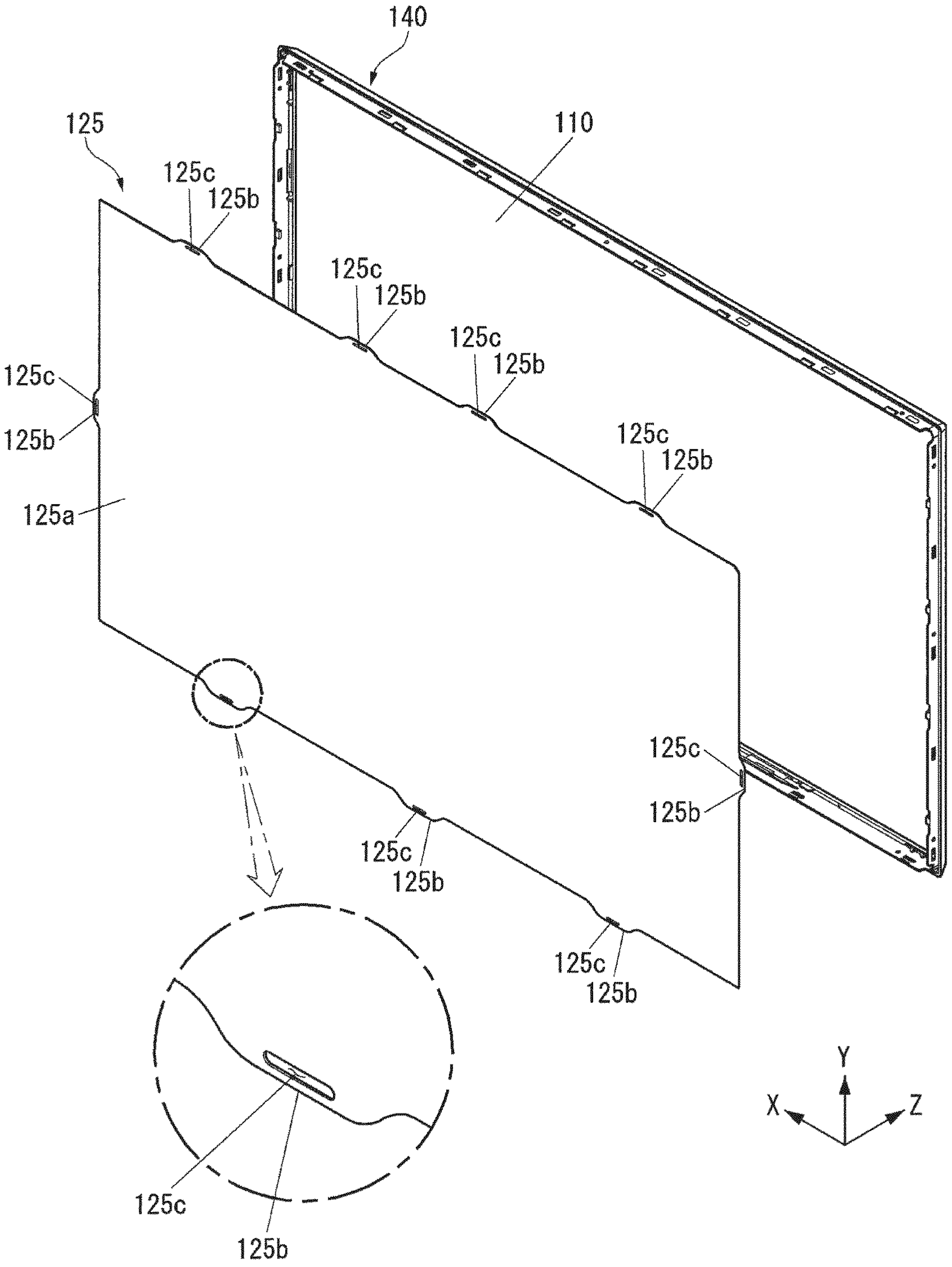

Referring to FIG. 10, an optical sheet 125 may be coupled to the front cover 140. The optical sheet 125 may be referred to as a composite sheet 125. The optical sheet 125 may include a flat portion 125*a* having a quadrilateral shape and an ear 125*b* coupled to the flat portion 125*a*. The plurality of ears 125*b* may be formed along the perimeter of the flat portion 125*a*. The ear 125*b* may include a hole 125*c*. The optical sheet 125 can diffuse light emitted from the light source 124 (see FIG. 17). The optical sheet 125 can refract or concentrate light emitted from the light source 124. The optical sheet 125 can simultaneously perform a function of a diffusion sheet and a function of a prism sheet.

Figure 11:
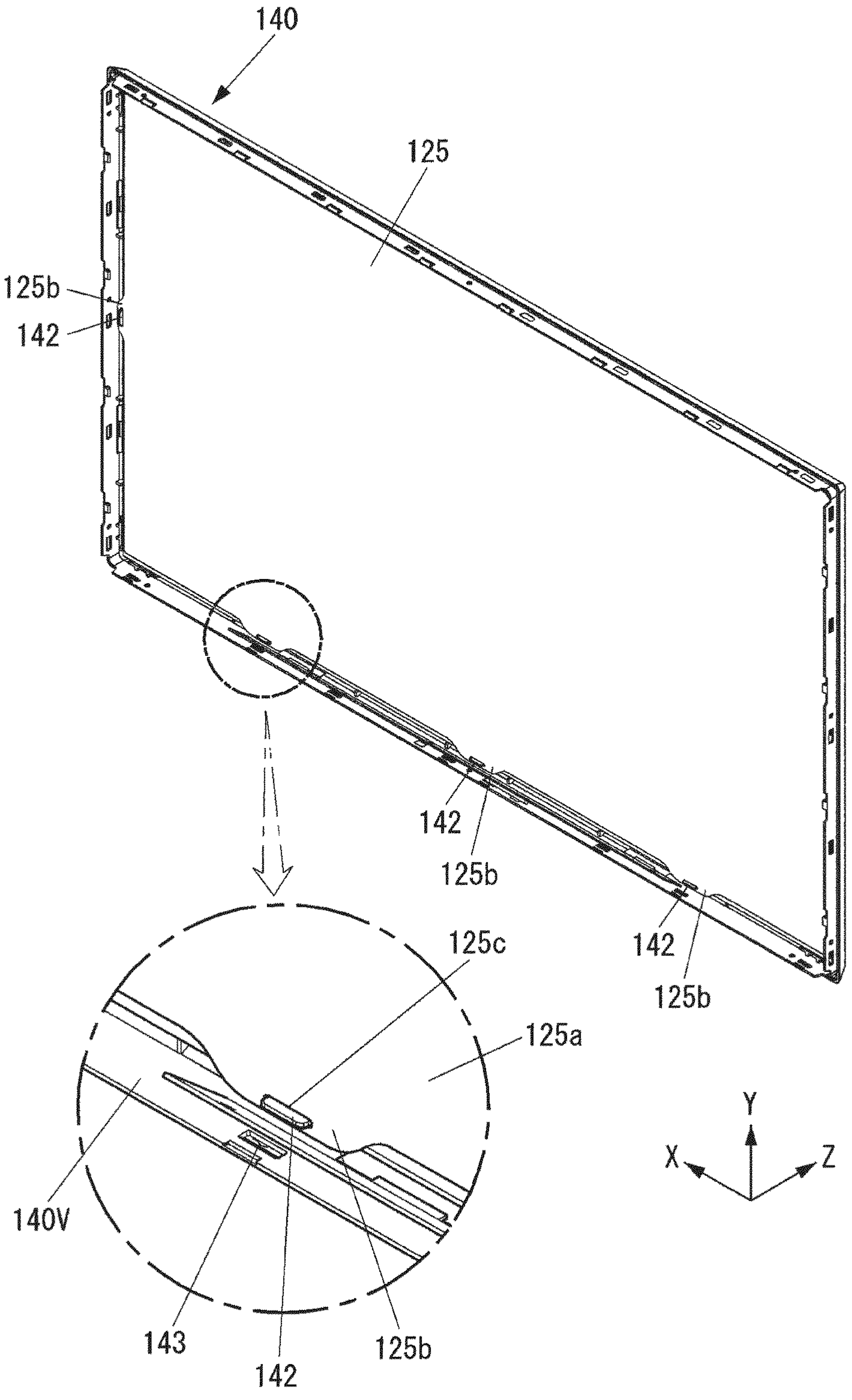

Referring to FIG. 11, the hook portion 142 may pass through the hole 125*c*. The ear 125*b* may be formed at a location corresponding to the hook portion 142. The optical sheet 125 can be coupled to the front cover 140 by catching on the hook portion 142. The optical sheet 125 may face the rear surface of the display panel 110.

Figure 12:
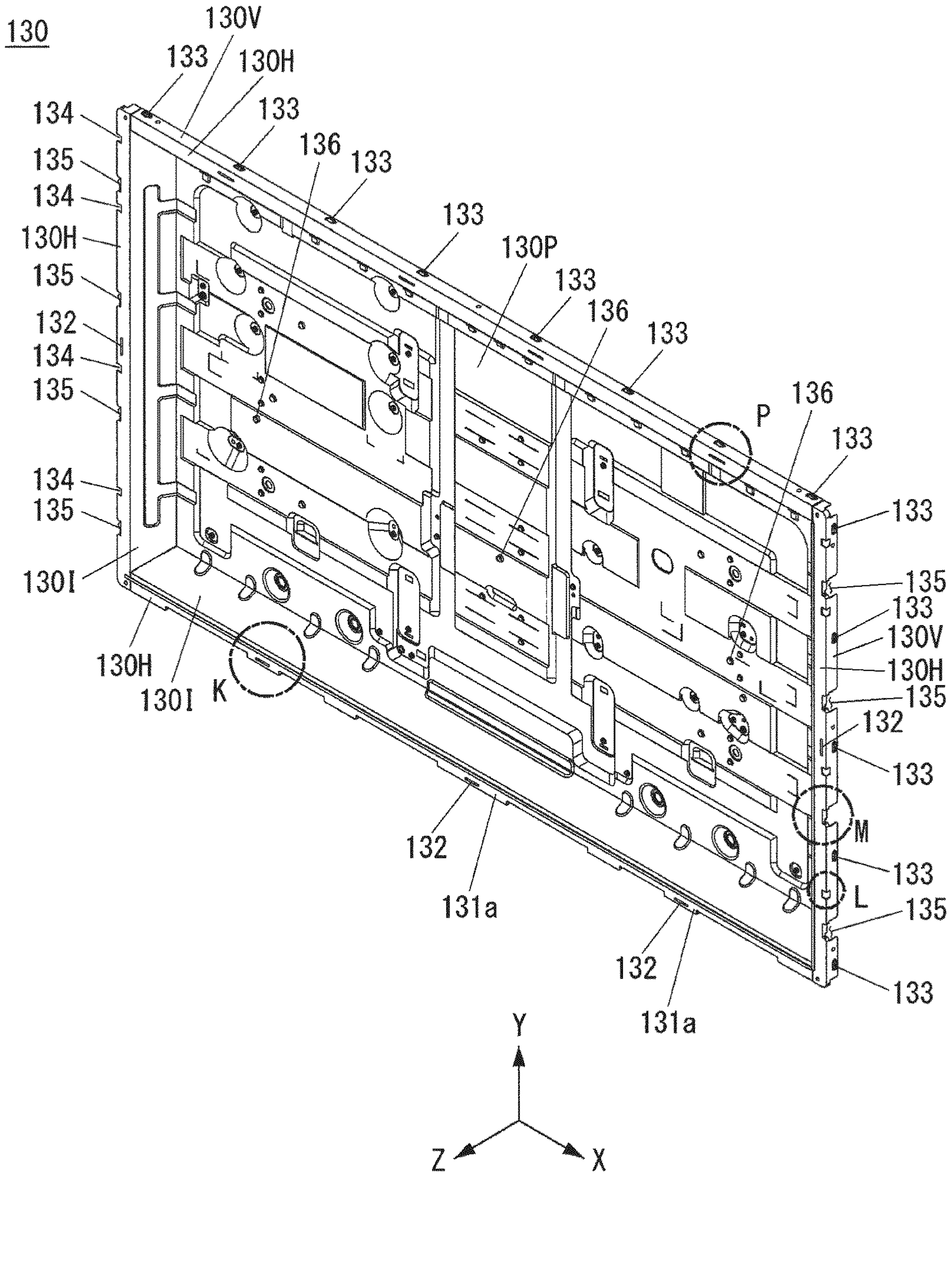
Figure 13:
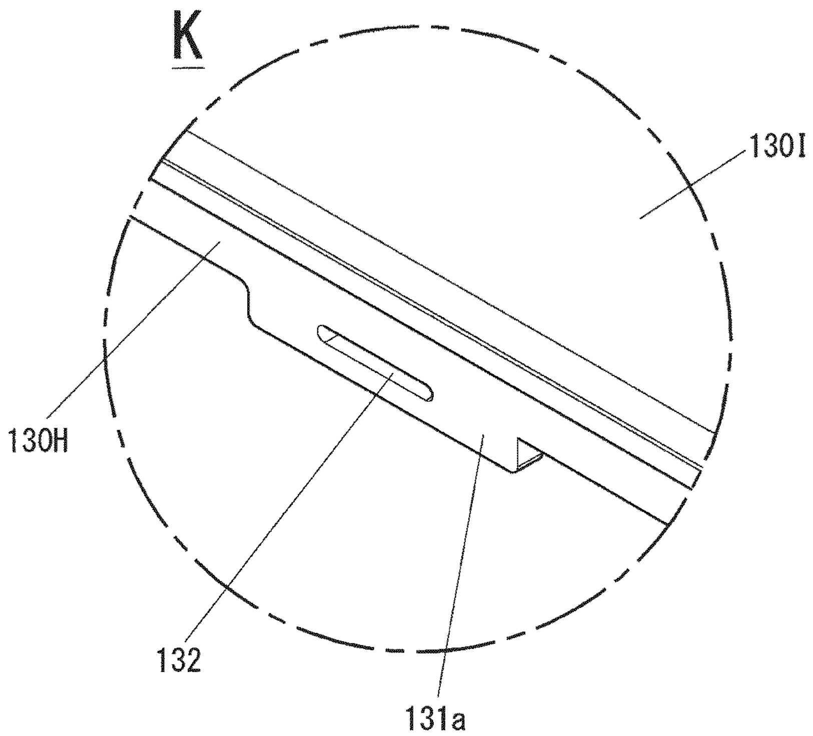

Referring to FIGS. 12 and 13, a frame 130 may include a flat portion 130P, an inclined portion 130I, a horizontal portion 130H, or a vertical portion 130V. The flat portion 130P may have a quadrilateral shape. The inclined portion 130I may be extended forward at the perimeter of the flat portion 130P. The inclined portion 130I may be obliquely coupled to the flat portion 130P. The horizontal portion 130H may be extended from the inclined portion 130I. The horizontal portion 130H may be parallel to the flat portion 130P. The vertical portion 130V may be extended rearward from the horizontal portion 130H. The vertical portion 130V and the horizontal portion 130H may be perpendicular to each other. The horizontal portion 130H may include an ear 131*a*. The plurality of ears 131*a* may be formed along a lower side of the frame 130. The ear 131*a* may include a hole 132. The hole 132 may be formed in the horizontal portion 130H. The plurality of holes 132 may be formed along the perimeter of the frame 130. The flat portion 130P may include a protrusion 136 protruding forward. The protrusion 136 may be referred to as a projection 136 or a guide 136. The plurality of protrusions 136 may be formed. An electronic substrate for driving the display device 100 may be fastened to a rear surface of the frame 130.

Figure 14:
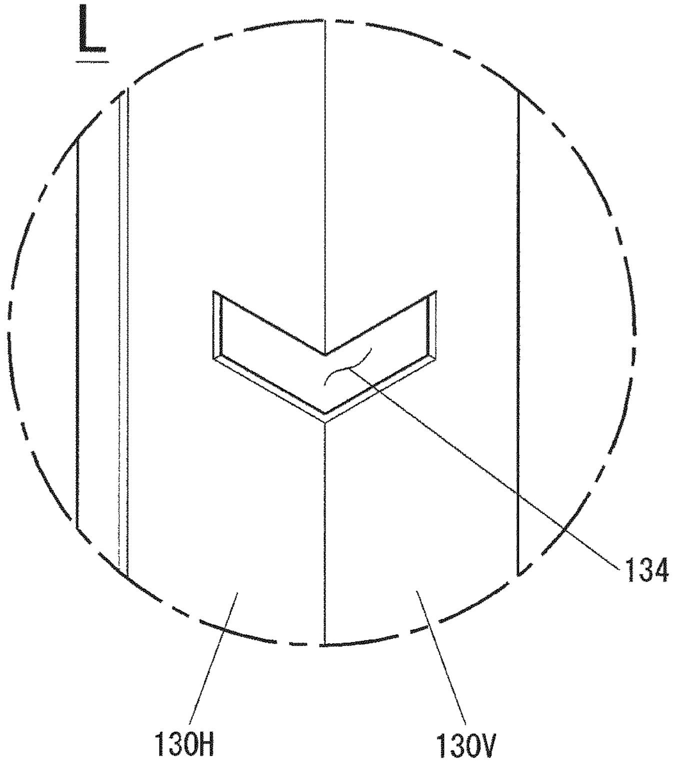

Referring to FIGS. 12 and 14, the frame 130 may include a hole 134. The hole 134 may be formed in the horizontal portion 130H or the vertical portion 130V. The hole 134 may be formed in a corner area formed by the horizontal portion 130H and the vertical portion 130V. The hole 134 may be formed over the horizontal portion 130H and the vertical portion 130V. The plurality of holes 134 may be formed along the perimeter of the frame 130.

Figure 15:
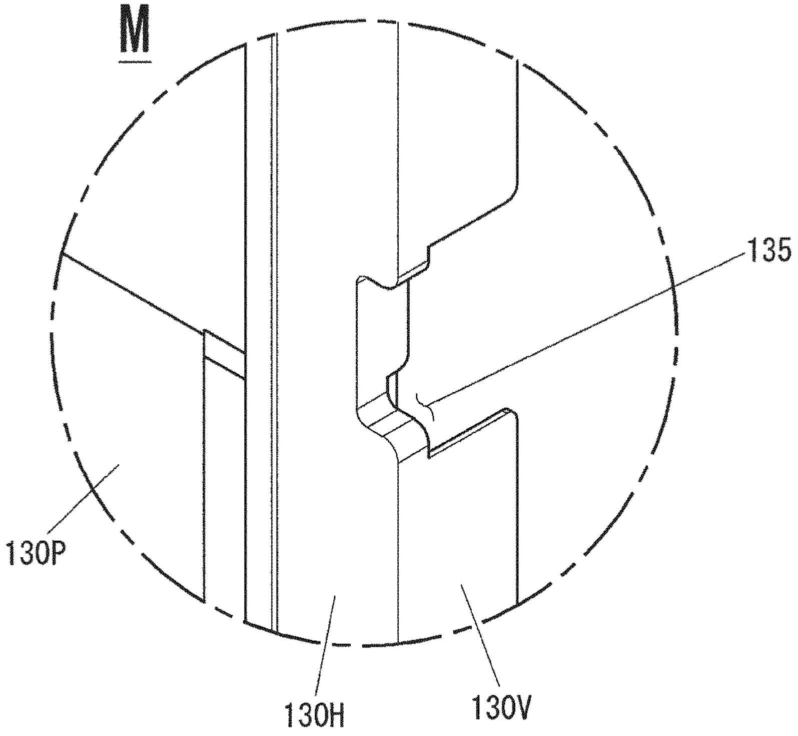

Referring to FIGS. 12 and 15, the frame 130 may include a hole 135. The hole 135 may be referred to as an opening 135, an indentation 135 or a depression 135. The hole 135 may partition the vertical portion 130V. The hole 135 may be opened rearward. The hole 135 may be formed in the horizontal portion 130H or the vertical portion 130V. The hole 135 may be formed in a corner area formed by the horizontal portion 130H and the vertical portion 130V. The hole 135 may be formed over the horizontal portion 130H and the vertical portion 130V. The plurality of holes 135 may be formed along the perimeter of the frame 130.

Figure 16:
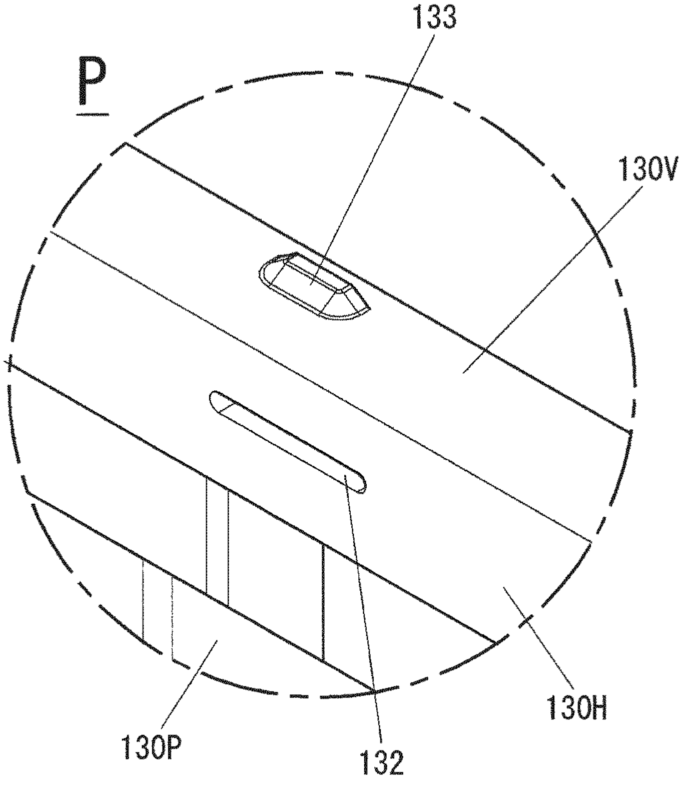

Referring to FIGS. 12 and 16, a protrusion 133 may be formed in the vertical portion 130V. The protrusion 133 may be referred to as a coupling portion 133, a hook 133, a latching jaw 133, or a fastening portion 133. The protrusion 133 may protrude to the outside of the frame 130. The protrusion 133 may be formed by pressing the vertical portion 130V. The plurality of protrusions 133 may be formed along the perimeter of the frame 130.

Figure 17:
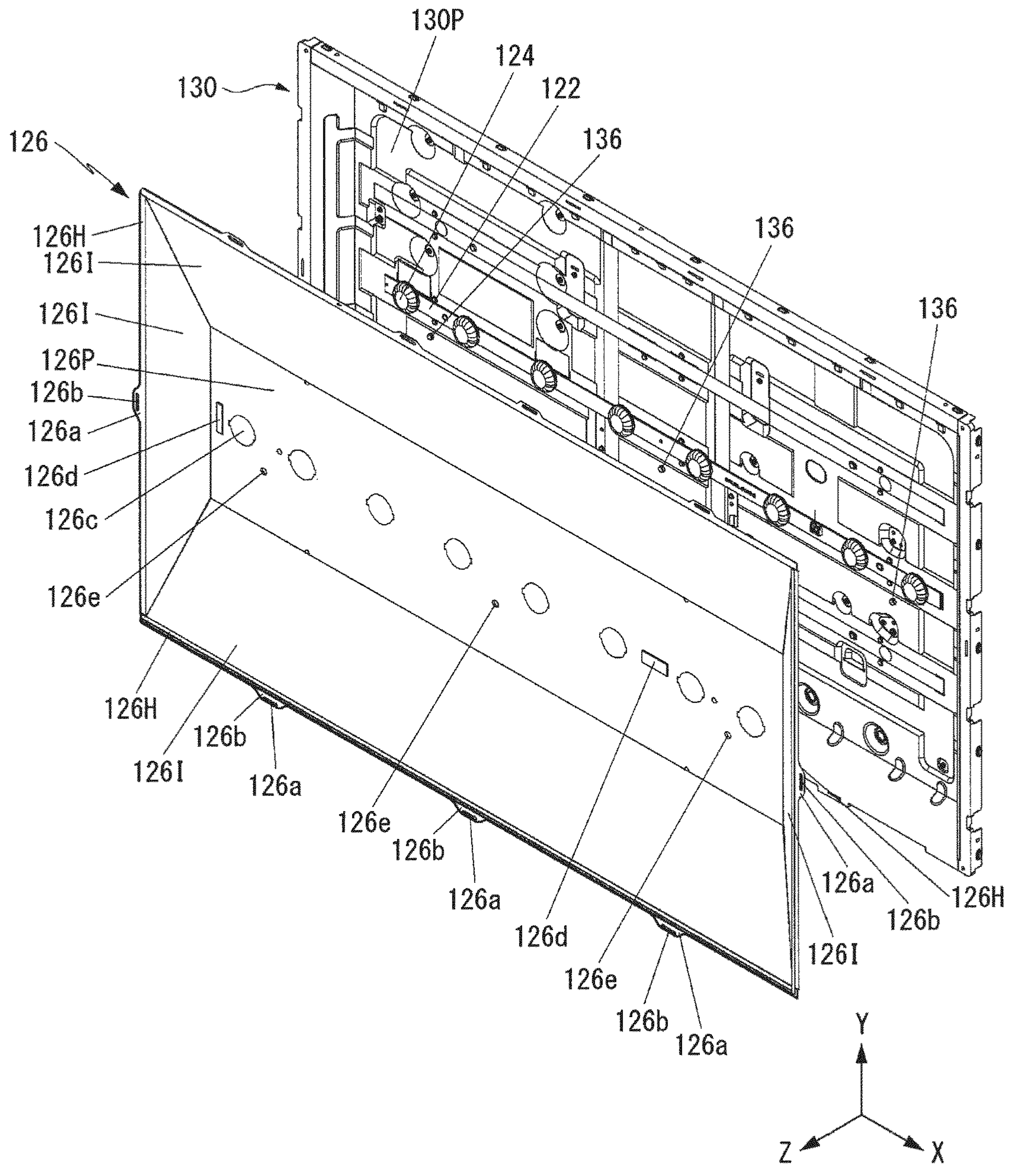

Referring to FIG. 17, the substrate 122 may be fastened to the flat portion 130P. The substrate 122 may be extended along the long side of the frame 130. The light source 124 may be mounted on the substrate 122. The plurality of light sources 124 may be formed along the substrate 122. The light source 124 may provide light forward. A reflective sheet 126 may include holes 126*c*, 126*d*, and 126*e*. The hole 126*c* may be formed at a location corresponding to the light source 124. The hole 126*e* may be formed at a location corresponding to the protrusion 136. The hole 126*d* may be formed at a location corresponding to a pin 127 (see FIG. 18). The reflective sheet 126 can reflect forward the light emitted from the light source 124. The reflective sheet 126 may include at least one of metal and metal oxide which are a reflective material. The reflective sheet 126 may include metal and/or metal oxide having a high reflectance, for example, at least one of aluminum (Al), silver (Ag), gold (Au), and titanium dioxide ($TiO_2$).

The reflective sheet 126 may be formed by depositing and/or coating the metal or the metal oxide. An ink including a metal material may be printed on the reflective sheet 126. A deposition layer may be formed on the reflective sheet 126 using a thermal deposition method, an evaporation method, or a vacuum deposition method such as a sputtering method. A coating layer and/or a printing layer may be formed on the reflective sheet 126 using a printing method, a gravure coating method, or a silk screen method.

Figure 18:
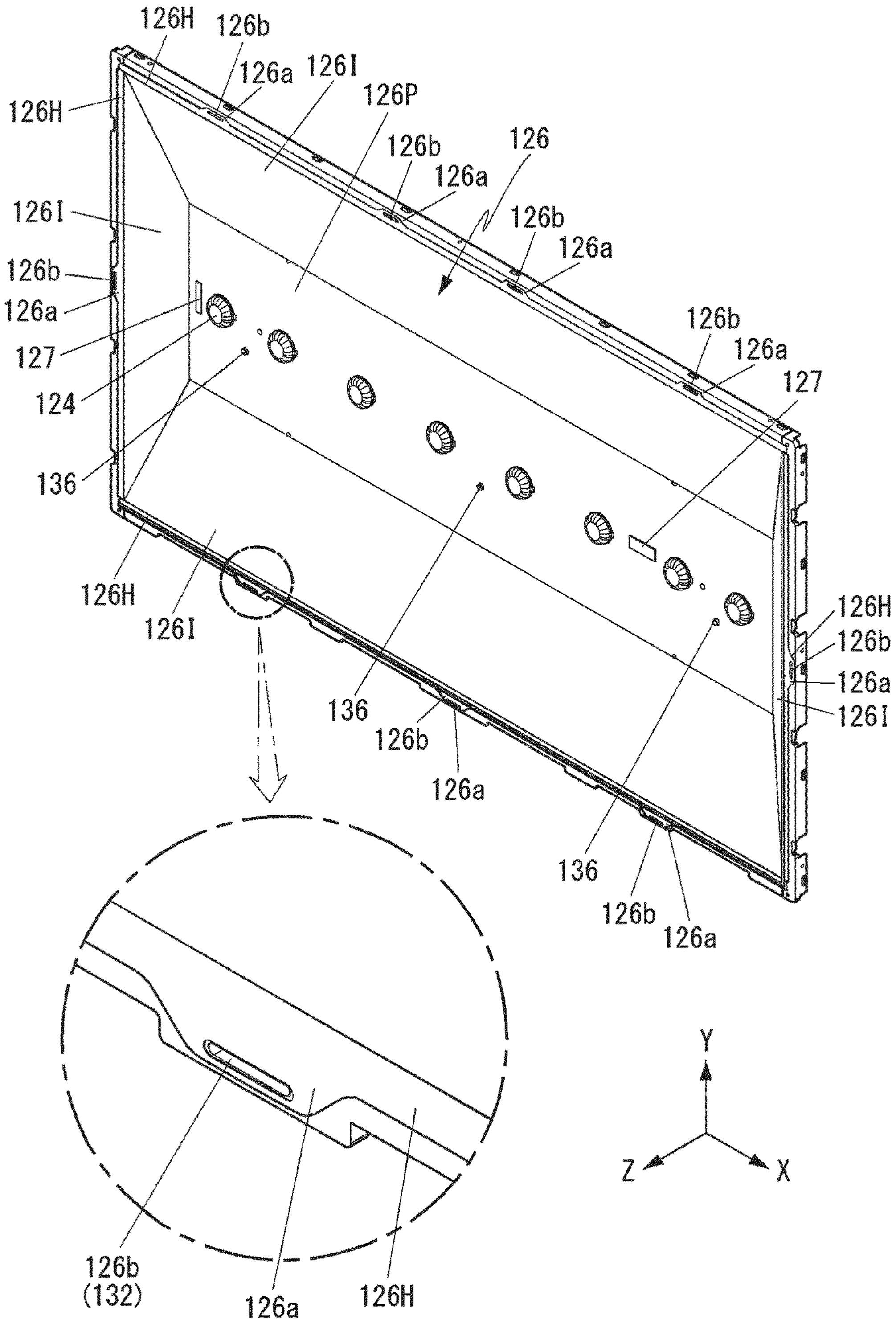

Referring to FIG. 18, the reflective sheet 126 may be coupled to the frame 130. The reflective sheet 126 may include a flat portion 126P, an inclined portion 126I, a horizontal portion 126H, or a vertical portion 126V. The flat portion 126P may have a quadrilateral shape. The inclined portion 126I may be extended forward at the perimeter of the flat portion 126P. The inclined portion 126I may be obliquely coupled to the flat portion 126P. The horizontal portion 126H may be extended from the inclined portion 126I. The horizontal portion 126H may be parallel to the flat portion 126P. The vertical portion 126V may be extended rearward from the horizontal portion 126H. The vertical portion 126V and the horizontal portion 126H may be perpendicular to each other. The horizontal portion 126H may include an ear 126*a*. The plurality of ears 126*a* may be formed along a lower side of the reflective sheet 126. The ear 126*a* may include a hole 126*b*. The protrusion 136 may pass through the reflective sheet 126. The protrusion 136 can guide a location of the reflective sheet 126. The pin 127 may be fastened to the frame 130. The pin 127 may fix the reflective sheet 126 to the frame 130. The holes 126*b* and 132 may face each other. The reflective sheet 126 can reflect forward light emitted from the light source 124.

Figure 19:
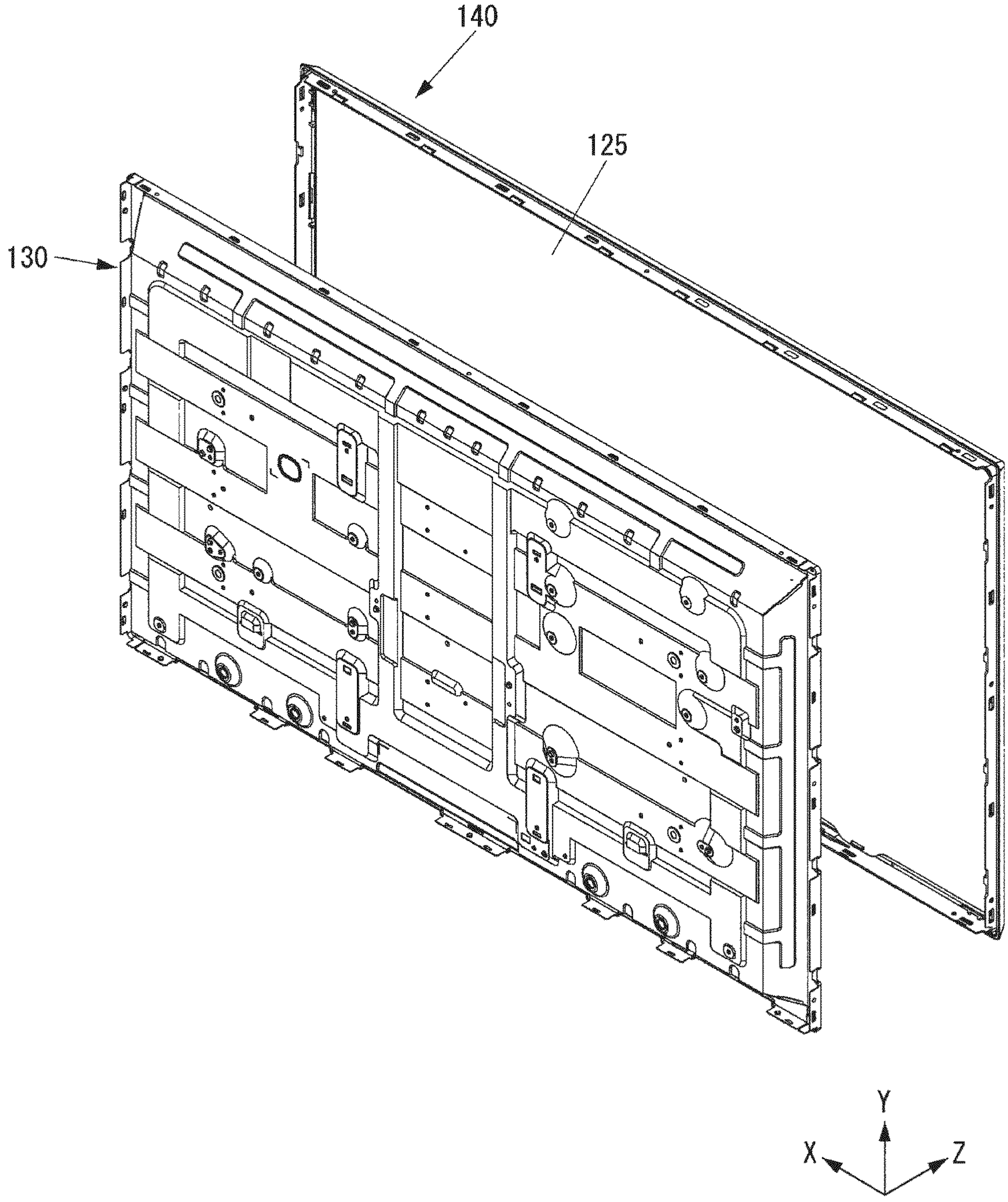

Referring to FIG. 19, the frame 130 may be fastened to the front cover 140. The frame 130 may be fastened to the front cover 140 in a state where the frame 130 is fastened to the substrate 122, the light source 124, or the reflective sheet 126. The frame 130 may be positioned in the rear of the front cover 140.

Figure 20:
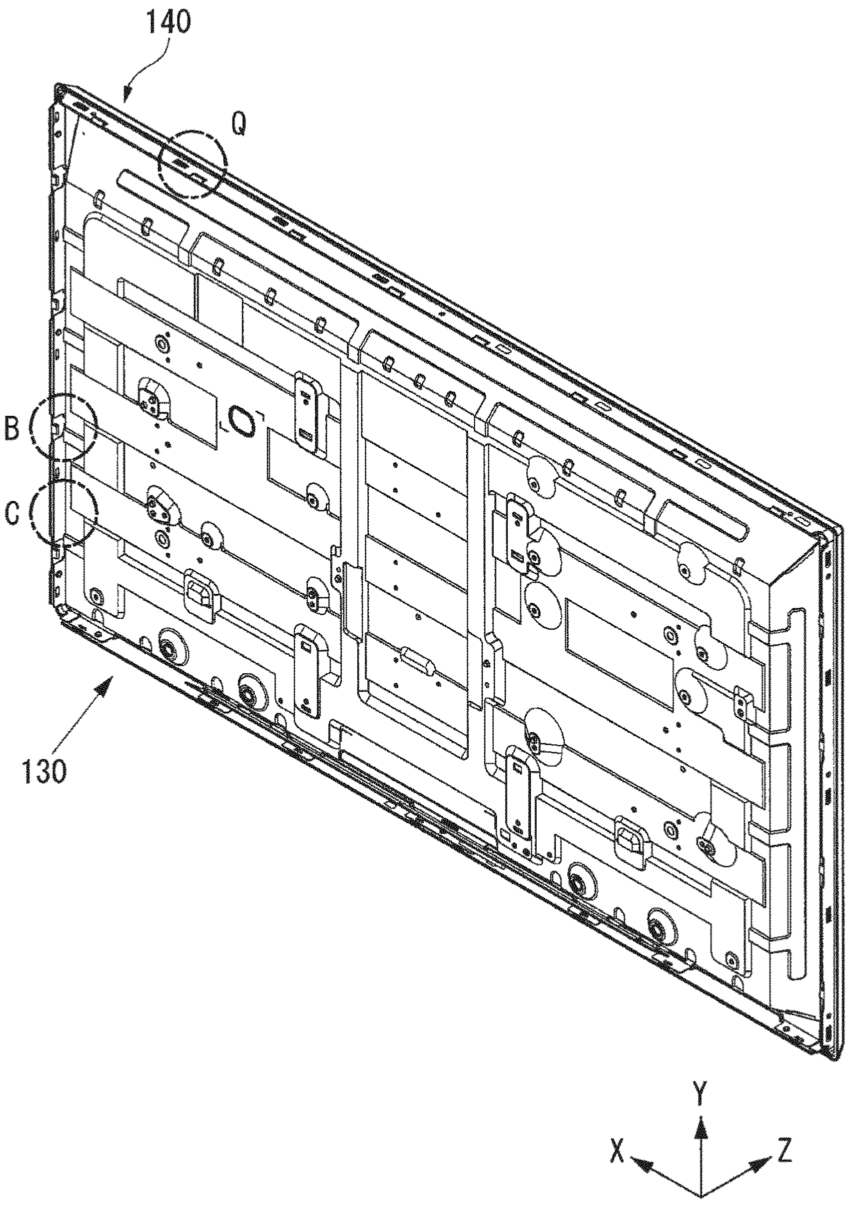
Figure 21:
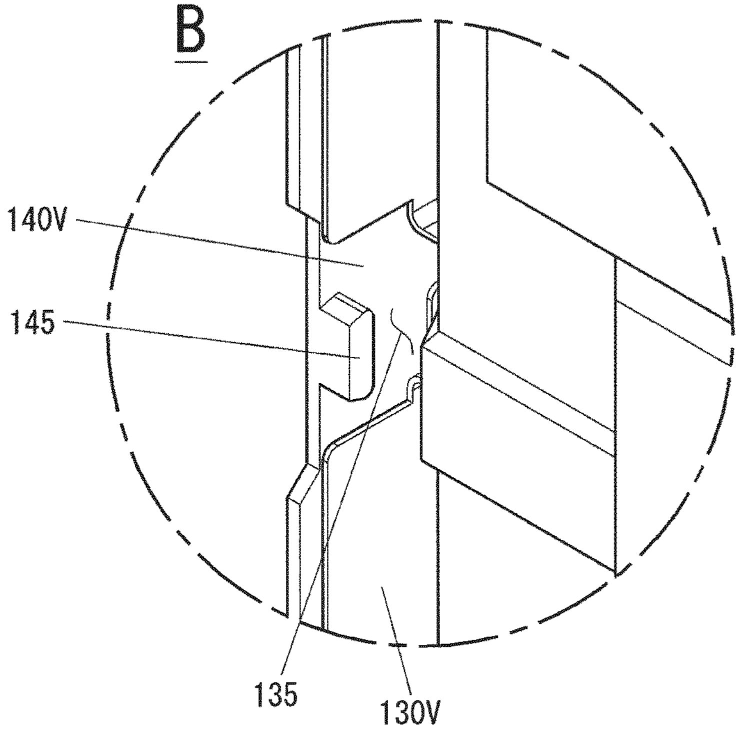

Referring to FIGS. 20 and 21, the vertical portions 140V and 130V may be adjacent to or in contact with each other. The protrusion 145 may be located in the hole 135.

Figure 22:
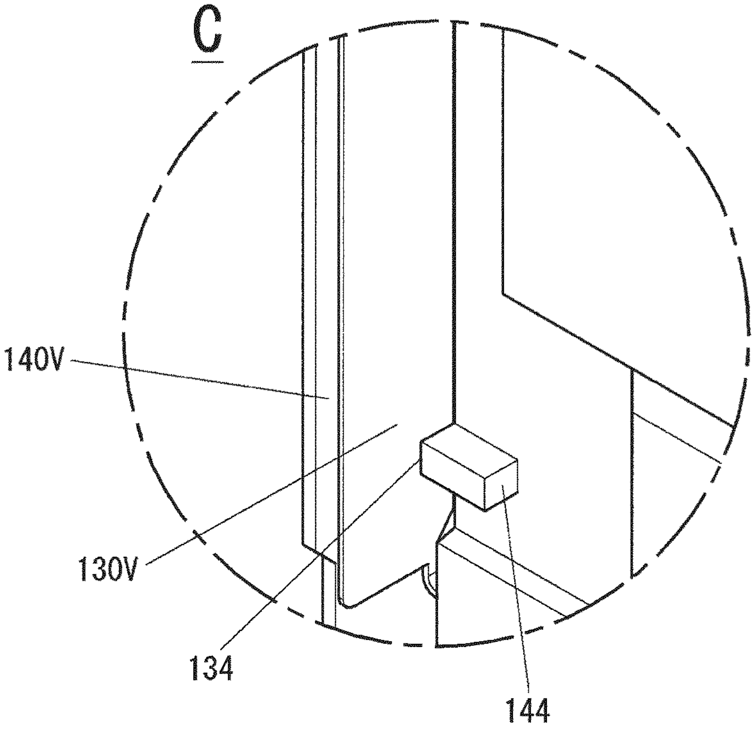

Referring to FIGS. 20 and 22, the rib 144 may be inserted into the hole 134. A position of the frame 130 can be guided by inserting the rib 144 into the hole 134.

Figure 23:
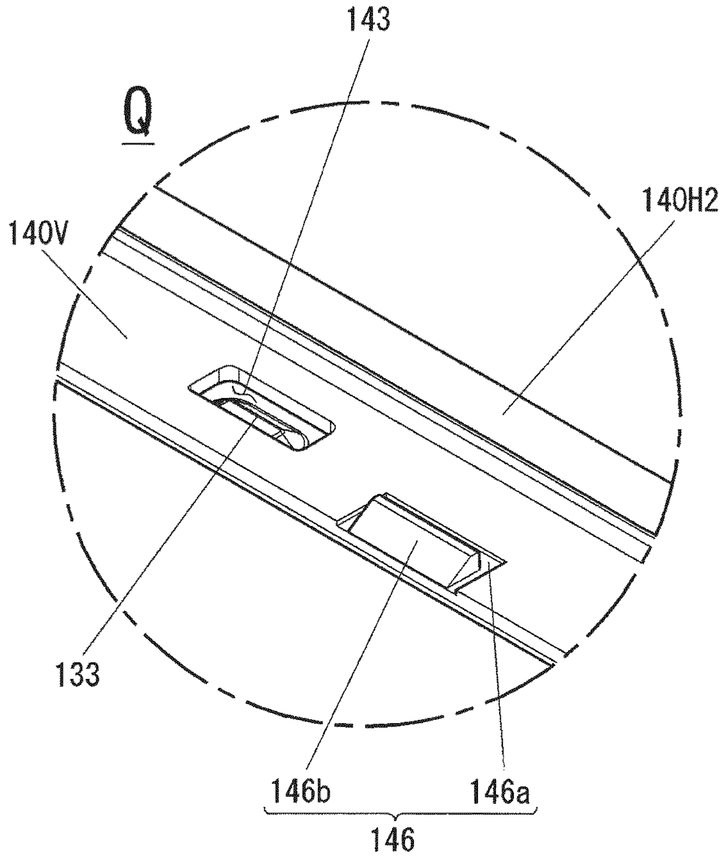

Referring to FIGS. 20 and 23, the protrusion 133 may be inserted into the hole 143. The frame 130 can be fastened to the front cover 140 by inserting the protrusion 133 into the hole 143.

Figure 24:
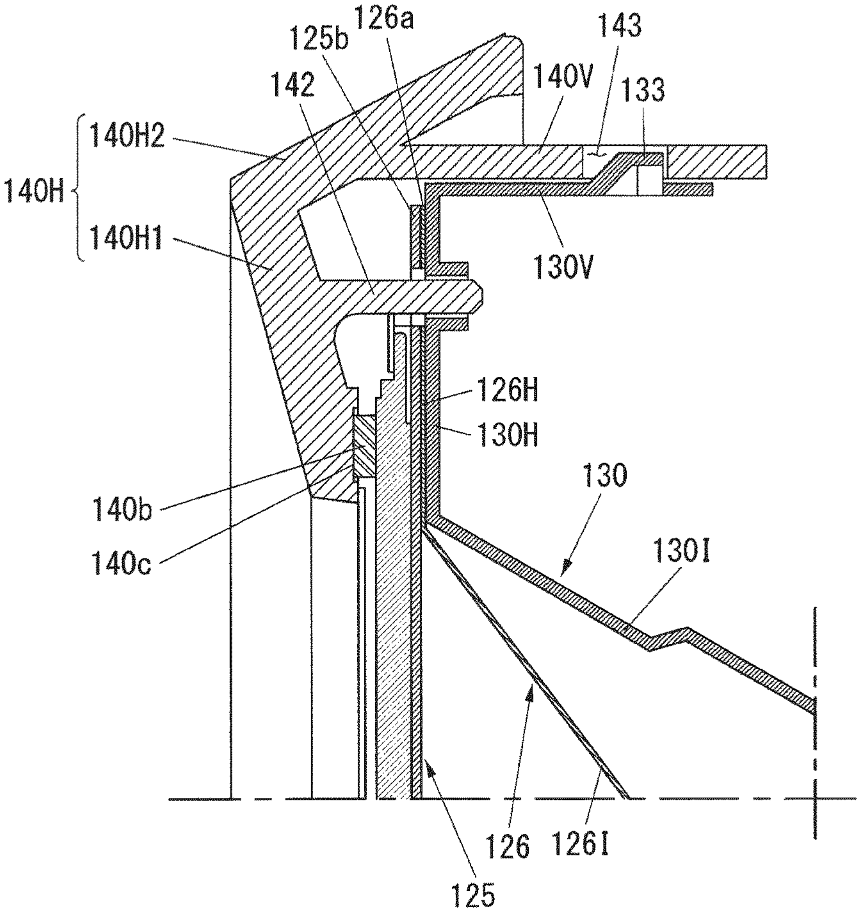
Figure 25:
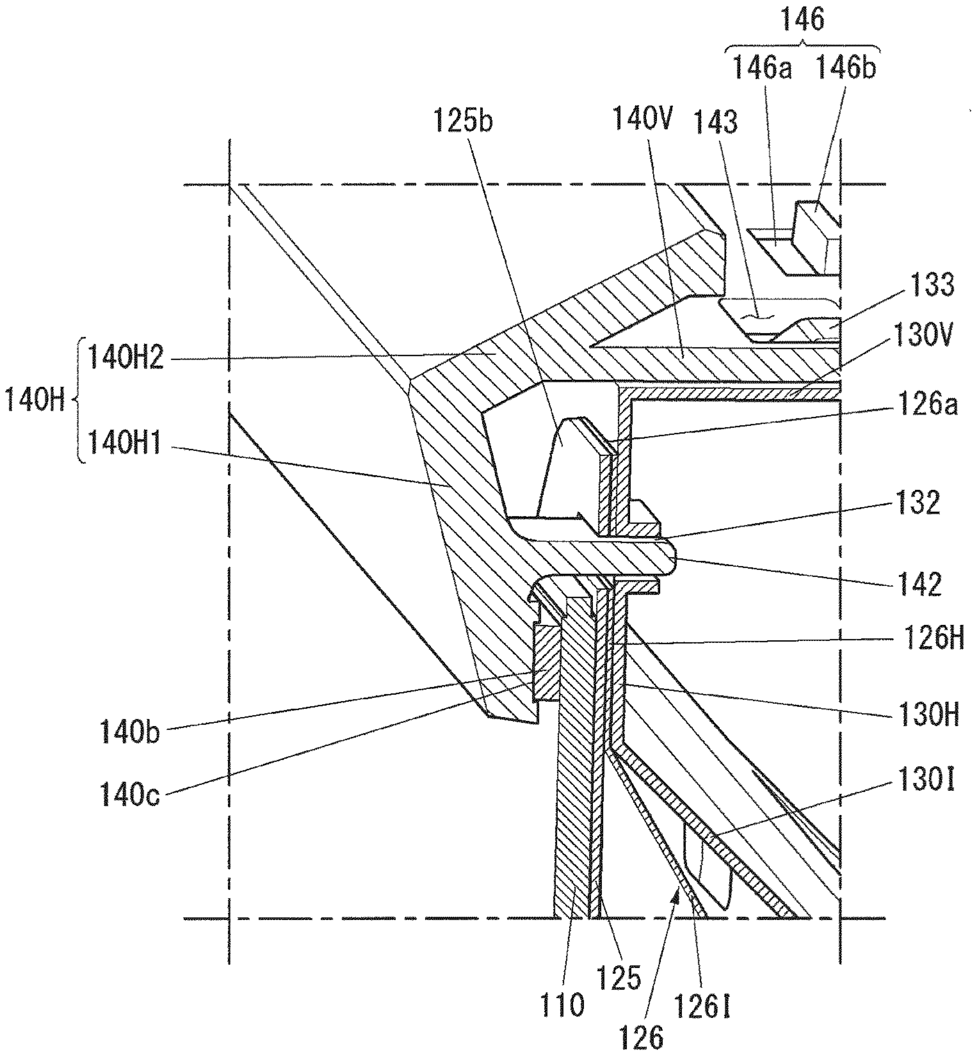

Referring to FIGS. 24 and 25, the hook portion 142 may face the side surface of the display panel 110. The hook portion 142 may pass through the optical sheet 125, the reflective sheet 126, or the frame 130. The hook portion 142 may pass through the holes 125*a*, 126*b*, and 132. The display panel 110 may be positioned between the pad 140*b* and the optical sheet 125. The frame 130 may be fastened to the front cover 140. The protrusion 133 may be inserted into the hole 143. The pad 140*b*, the display panel 110, the optical sheet 125, and the reflective sheet 126 can be pressurized by fastening the frame 130 to the front cover 140. The pad 140*b*, the display panel 110, the optical sheet 125, and the reflective sheet 126 may be fixed between the frame 130 and the front cover 140.

Figure 26:
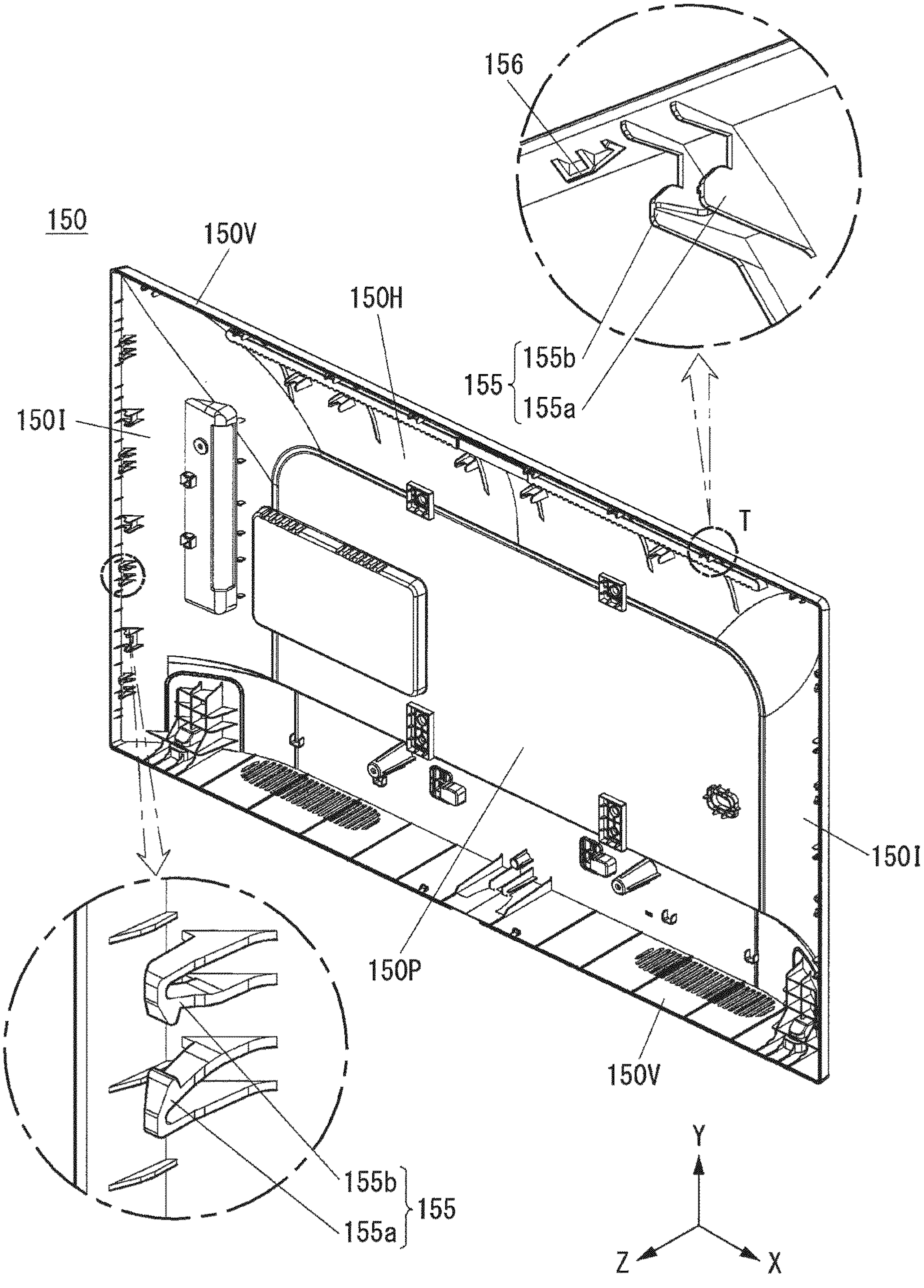

Referring to FIG. 26, the back cover 150 may include a flat portion 150P, an inclined portion 150I, or a vertical portion 150V. The flat portion 150P may have a quadrilateral shape. The inclined portion 150I may be extended forward from an upper side or a side of the flat portion 150P. The inclined portion 150I may be obliquely coupled to the flat portion 150P. The vertical portion 150V may be extended forward from the inclined portion 150I. The vertical portion 150V may be extended forward at a lower side of the flat portion 150P. A coupling portion 155 may be formed on the inclined portion 150I. The coupling portion 155 may be referred to as a fastening portion 155. The coupling portion 155 may include a first part 155*a* and a second part 155*b*. The first part 155*a* and the second part 155*b* may be adjacent to each other. The first part 155*a* and the second part 155*b* may have a hook shape. The plurality of coupling portions 155 may be formed along the inclined portion 155I. A protrusion 156 may protrude inward from the vertical portion 155V. The protrusion 156 may be referred to as a coupling portion 156, a fastening portion 156, a latching jaw 156, a latching portion 156, or a hook 156. The plurality of protrusions 156 may be formed along the vertical portion 150V.

Figure 27:
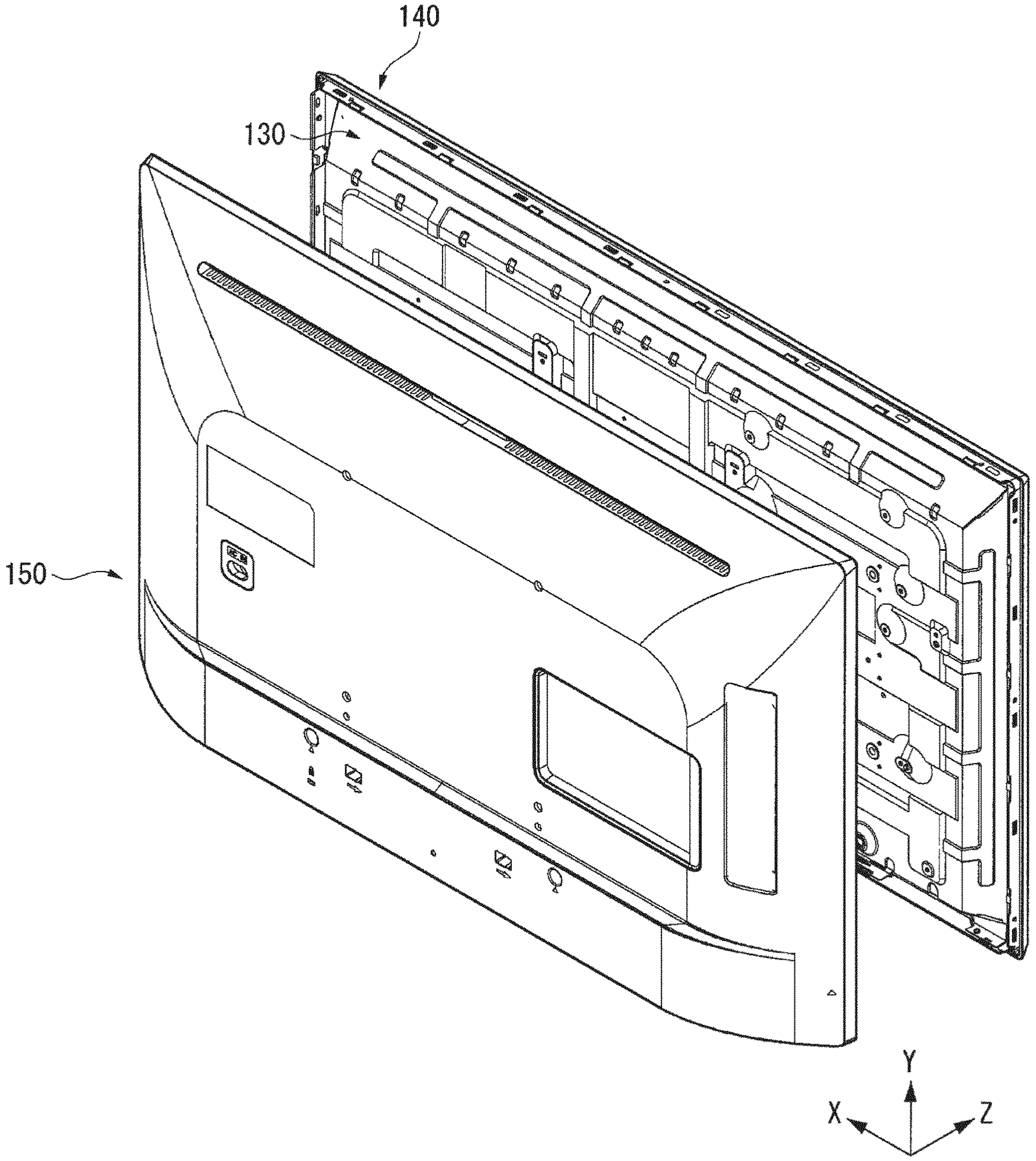

Referring to FIG. 27, the back cover 150 may be fastened to the front cover 140. The back cover 150 may be positioned in the rear of the front cover 140. The display panel 110, the optical sheet 125, the reflective sheet 126, and the frame 130 may be positioned between the back cover 150 and the front cover 140.

Figure 28:
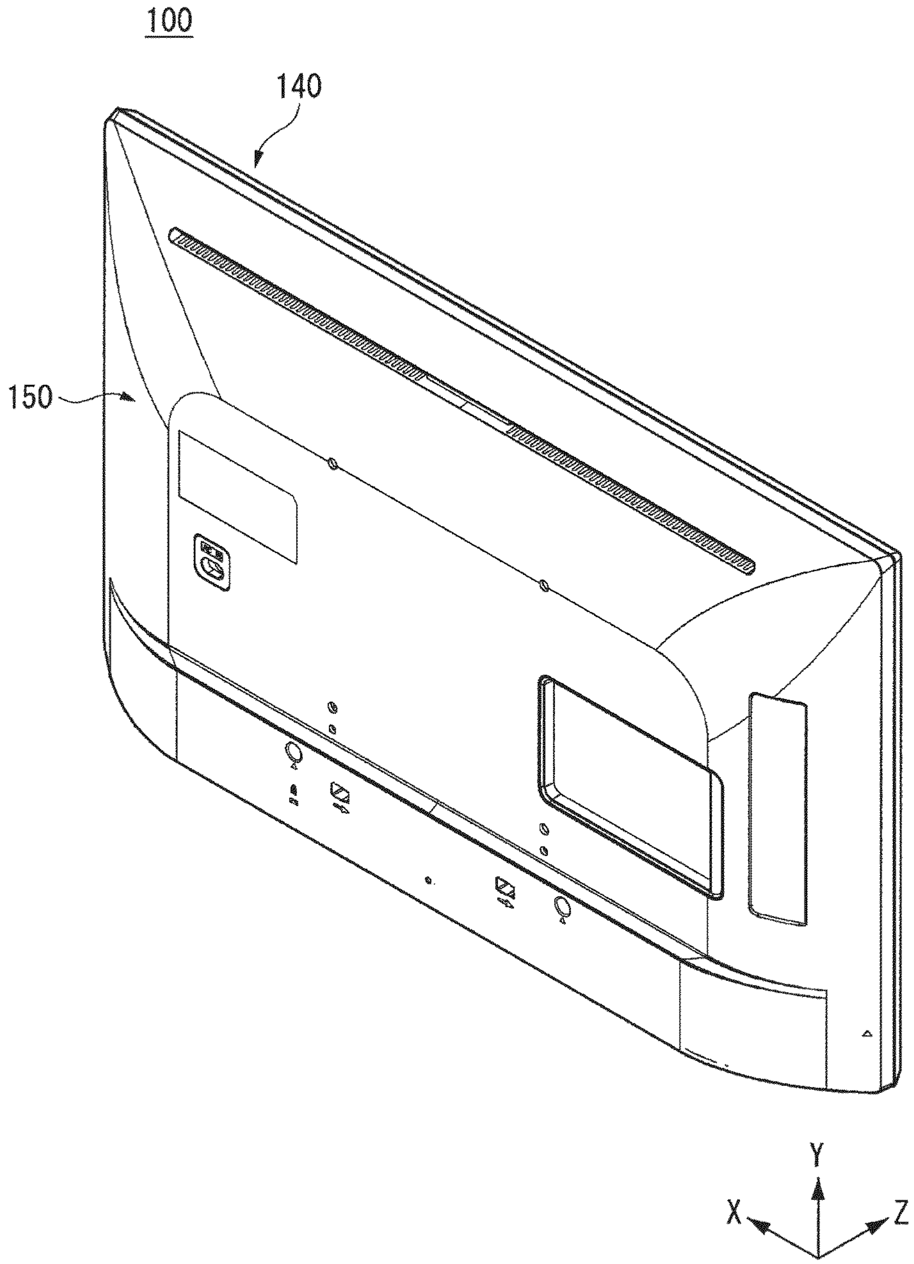

Referring to FIG. 28, the back cover 150 may be fastened to the front cover 140. The back cover 150 may include a port, a power input port, etc. for being connected to an external device on its back surface.

Figure 29:
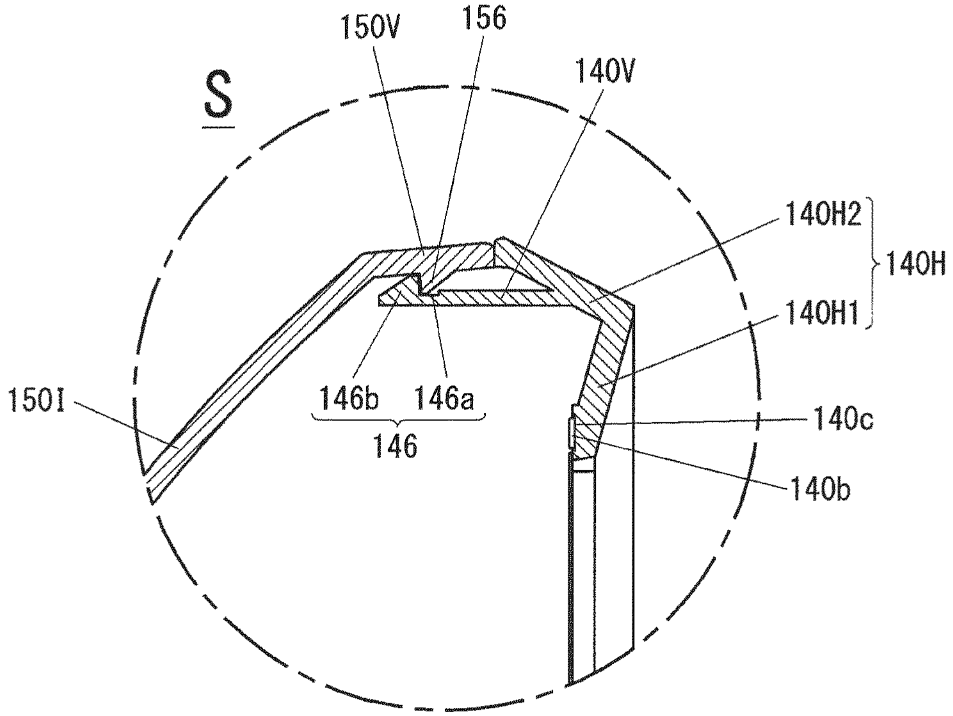

Referring to FIG. 29, the protrusions 146*b* and 156 may be engaged with each other. The second horizontal part 140H2 and the protrusion 146*b* can fix the vertical part 150V. The back cover 150 can be fastened to the front cover 140 by engaging the protrusions 146*b* and 156 with each other.

Figure 30:
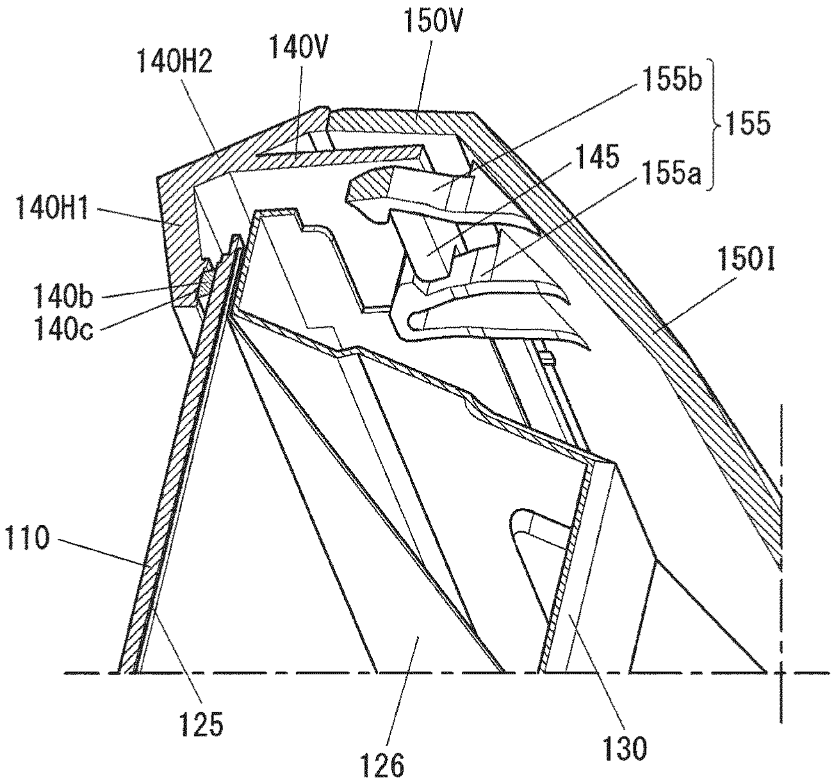

Referring to FIG. 30, the coupling portion 155 may be engaged with the protrusion 145. The protrusion 145 may be positioned between the first part 155*a* and the second part 155*b*. The back cover 150 can be fastened to the front cover 140 by engaging the coupling portion 155 with the protrusion 145.

The optical sheet 125, the substrate 122, and the light source 124 may be collectively referred to as a backlight unit. The backlight unit may include at least one of an optical sheet, a substrate, a light source, and a light guide plate. The light source may be a direct type light source or an edge type light source. The backlight unit can provide light to the display panel 110. The backlight unit may be driven in an entire driving method or a partial driving method, such as a local dimming method and an impulsive driving method.

The number of components of the display device 100 can be reduced by coupling the display panel 110, the optical sheet 125, the frame 130, the back cover 150, etc. to the front cover 140. For example, the front cover 140 may replace a function of a guide panel. In addition, a thickness of the display device 100 can be reduced by reducing the number of components of the display device 100.

The assembly process efficiency of the display device 100 can be increased by coupling the display panel 110, the optical sheet 125, the frame 130, the back cover 150, etc. to the front cover 140. For example, the assembly process can be simplified and the assembly process speed can be increased by disposing the front cover 140 at the bottom and stacking the other components on the front cover 140.

The foregoing embodiments are merely examples and are not to be considered as limiting the present disclosure. The present teachings can be readily applied to other types of methods and apparatuses. The features, structures, methods, and other characteristics of the embodiments described herein may be combined in various ways to obtain additional and/or alternative embodiments.

Certain embodiments or other embodiments of the disclosure described above are not mutually exclusive or distinct from each other. Any or all elements of embodiments of the disclosure described above may be combined or combined with each other in configuration or function.

For example, a configuration "A" described in one embodiment of the disclosure and the drawings and a configuration "B" described in another embodiment of the disclosure and the drawings may be combined with each other. Namely, although the combination between the configurations is not directly described, the combination is possible except in the case where it is described that the combination is impossible.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device comprising:
- a display panel;
- a frame at a rear of the display panel;
- a back cover at a rear of the frame; and
- a front cover coupled with the back cover,
- wherein the front cover comprises:
- a horizontal part covering an edge of a front surface of the display panel; and
- a vertical part rearwardly extending from the horizontal part and covering a side of the display panel,
- wherein the back cover comprises:
- a horizontal portion facing the rear of the frame;
- a vertical portion extending from the horizontal portion to be aligned with the vertical part of the front cover;
- a coupling portion protruding from an inside of the back cover and extending over an inner surface of the vertical portion with a gap between the inner surface of the vertical portion and the coupling portion; and
- a protrusion formed at the inner surface of the vertical portion and positioned adjacent to the coupling portion,
- wherein the vertical part of the front cover is inserted into the gap between the inner surface of the vertical portion and the coupling portion of the back cover, and
- wherein a latching portion of the vertical part of the front cover is aligned with the protrusion of the back cover such that the protrusion of the vertical portion of the back cover is engaged with the latching portion of the vertical part of the front cover.

2. The display device of claim 1, wherein the horizontal part of the front cover includes:
- a first horizontal part; and
- a second horizontal part positioned farther away from a center of the display panel than the first horizontal part, the first horizontal part and the second horizontal part extending in different directions,
- wherein an end part of the second horizontal part is supported by an end part of the vertical portion of the back cover, and
- wherein a pad is fixed to a rear surface of the first horizontal part of the front cover such that the pad is positioned between a front surface of the display panel and the first horizontal part of the front cover.

3. The display device of claim 2, wherein an overlapping potion of the vertical part of the front cover and the vertical portion of the back cover is formed between an end of the vertical part of the front cover and a supporting point of the end part of the second horizontal part by the end part of the vertical portion of the back cover.

4. The display device of claim 3, wherein a first overlapping potion of the vertical part of the front cover and the vertical portion of the back cover is formed in a first distance between an end of the vertical part of the front cover and a supporting point of the end part of the second horizontal part by the end part of the vertical portion of the back cover,
- wherein a second overlapping portion of the vertical part of the front cover and the coupling portion is formed in a second distance between the end of the vertical part of the front cover and an end of the coupling portion, and
- wherein the first distance is greater than the second distance.

5. The display device of claim 2, wherein the end part of the second horizontal part is in contact with the end part of the vertical portion of the back cover such that the vertical part of the front cover is inserted into the gap within a predetermined length.

6. The display device of claim 1, wherein the coupling portion includes a first part and a second part forming a pair of ribs, and
- wherein the gap is formed between the vertical portion of the back cover and the pair of ribs.

7. The display device of claim 6, wherein the first part and the second part as the pair of ribs form a pair of walls at the vertical portion of the back cover.

8. The display device of claim 6, wherein ends of the first part and the second part of the coupling portion are rounded at the gap.

9. The display device of claim 8, wherein the gap corresponds to a thickness of the vertical part of the front cover such that the rounded ends of the first part and the second part guide the vertical part of the front cover when the vertical part of the front cover is inserted into the gap of the back cover.

10. The display device of claim 6, wherein the first part and the second part are connected with each other by a third part facing the vertical portion of the back cover.

11. The display device of claim 6, wherein the back cover further comprises an extended portion extending from the horizontal portion to the vertical portion.

12. The display device of claim 11, wherein the first part and the second part of the coupling portion are formed at the extended portion of the back cover.

13. The display device of claim 1, wherein the vertical part of the front cover overlaps the vertical portion of the back cover.

14. The display device of claim 1, wherein the horizontal part of the front cover extends along an edge of the display panel and the vertical part of the front cover extends along the side of the display panel.

15. The display device of claim 1, further comprising:
- a light source between the frame and the display panel, the light source providing light to the display panel; and
- an optical sheet between the light source and the display panel.

16. The display device of claim 1, wherein the display panel includes a first long side, a second long side opposite the first long side, a first short side connecting the first long side and the second long side, and a second short side connecting the first long side and the second long side opposite the first short side, and
- wherein the back cover includes a plurality of coupling portions disposed adjacent to at least one of the first short side or the first long side and a plurality of protrusions disposed adjacent to the plurality of coupling portions such that each of the plurality of protrusions corresponds to each of the plurality of coupling portions.

17. The display device of claim 1, wherein the latching portion includes a groove formed at the vertical part of the front cover.

18. The display device of claim 1, wherein the latching portion includes a stepped portion formed at the vertical part of the front cover.

19. A display device comprising:

a display panel;

a frame at a rear of the display panel;

a back cover at a rear of the frame; and a front cover coupled with the back cover, wherein the front cover comprises:

a sideward part covering a portion of a front surface of the display panel; and an upward part rearwardly extending from the sideward part and covering a side of the display panel, wherein the back cover comprises:

a sideward portion facing in a direction towards the rear of the frame;

an upward portion extending from the sideward portion to be aligned with the upward part of the front cover;

a first coupling portion protruding from an inside of the back cover and extending over an inner surface of the upward portion with a gap between the inner surface of the upward portion and the first coupling portion; and a protrusion formed at the inner surface of the upward portion and positioned adjacent to the first coupling portion, wherein the upward part of the front cover is inserted into the gap between the inner surface of the upward portion and the first coupling portion of the back cover, and wherein a second coupling portion at the upward part of the front cover is and-aligned with the protrusion of the back cover such that the protrusion of the upward portion of the back cover is engaged with the second coupling portion of the upward part of the front cover.

20. The display device of claim 19, wherein the sideward part of the front cover includes:

a first sideward part; and a second sideward part positioned farther away from a center of the display panel than the first sideward part, the first sideward part and the second sideward part extending in different directions, wherein an end part of the second sideward part is supported by an end part of the upward portion of the back cover, and wherein a pad is fixed to a rear surface of the first sideward part of the front cover such that the pad is positioned between a front surface of the display panel and the first sideward part of the front cover.

21. The display device of claim 19, wherein the second coupling portion includes a groove formed at the upward part of the front cover.

22. The display device of claim 19, wherein the second coupling portion includes a stepped portion formed at the upward part of the front cover.

23. A display device comprising:

a display panel;

a frame at a rear of the display panel;

a back cover at a rear of the frame; and a front cover coupled with the back cover, wherein the front cover comprises:

a first component covering an edge of a front surface of the display panel; and a second component rearwardly extending from the first component and covering a side of the display panel, wherein the back cover comprises:

a first portion facing the rear of the frame;

a second portion extending from the first portion to be aligned with the second component of the front cover;

a coupling portion protruding from an inside of the back cover and extending over an inner surface of the second portion with a gap between the inner surface of the second portion and the coupling portion; and a protrusion formed at the inner surface of the second portion and positioned adjacent to the coupling portion, wherein the second component of the front cover is inserted into the gap between the inner surface of the second portion and the coupling portion of the back cover, and wherein the second part of the front cover is aligned with the protrusion of the back cover such that the protrusion of the second portion of the back cover is engaged with the second part of the front cover.

24. The display device of claim 23, wherein the first component of the front cover includes:

a first part; and a second part positioned farther away from a center of the display panel than the first part, the first part and the second part extending in different directions, wherein an end part of the second part is supported by an end part of the second portion of the back cover, and wherein a pad is fixed to a rear surface of the first part of the front cover such that the pad is positioned between a front surface of the display panel and the first part of the front cover.

* * * * *